(12) United States Patent
Yoshimi

(10) Patent No.: US 11,392,369 B2
(45) Date of Patent: Jul. 19, 2022

(54) MANAGEMENT APPARATUS, MANAGEMENT METHOD, AND MANAGEMENT SYSTEM

(71) Applicant: FUJITSU LIMITED, Kawasaki (JP)

(72) Inventor: Naoyuki Yoshimi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 536 days.

(21) Appl. No.: 16/509,584

(22) Filed: Jul. 12, 2019

(65) Prior Publication Data

US 2020/0050447 A1 Feb. 13, 2020

(30) Foreign Application Priority Data

Aug. 10, 2018 (JP) .............................. JP2018-151460

(51) Int. Cl.
*G06F 8/65* (2018.01)
*G06F 3/06* (2006.01)

(52) U.S. Cl.
CPC .............. *G06F 8/66* (2013.01); *G06F 3/0607* (2013.01); *G06F 3/067* (2013.01); *G06F 3/0632* (2013.01)

(58) Field of Classification Search
None
See application file for complete search history.

(56) References Cited

U.S. PATENT DOCUMENTS

| 2011/0107322 | A1 | 5/2011 | Hashiguchi |
| 2016/0112342 | A1 | 4/2016 | Doi |
| 2017/0046152 | A1* | 2/2017 | Shih ................... G06F 11/0727 |
| 2017/0147322 | A1* | 5/2017 | Vopni ....................... G06F 8/65 |
| 2017/0249195 | A1* | 8/2017 | Sadana ................. G06F 9/4881 |
| 2018/0181388 | A1* | 6/2018 | Takahashi ............... G06F 3/123 |

FOREIGN PATENT DOCUMENTS

| JP | 2011-95950 | 5/2011 |
| WO | 2015/001614 | 1/2015 |

* cited by examiner

*Primary Examiner* — Marina Lee
(74) *Attorney, Agent, or Firm* — Fujitsu Patent Center

(57) ABSTRACT

A management apparatus includes a memory configured to store, for each setting place, identification information for identifying an attribute of a device and device information for associating the identification information, a model of the device, and firmware version information of the device; and a processor coupled to the memory and configured to: specify, for each setting place, firmware version information of a same model among devices included in the device information associated with one kind of the identification information based on the identification information and the device information stored in the memory, and execute update processing of firmware of the device of the same model based on the specified firmware version information.

12 Claims, 30 Drawing Sheets

FIG. 3

| DEVICE MANAGEMENT NUMBER | MODEL | FIRMWARE INFORMATION |
|---|---|---|
| 10001 | RX2530M2 | V1.1 |
| 10002 | RX2540M2 | V1.1 |
| ⋮ | ⋮ | ⋮ |

FIG. 4

| COMPANY NAME | CONTRACT NUMBER |
|---|---|
| COMPANY A | 5001 |

FIG. 6

| COMPANY NAME | COMPANY ID |
|---|---|
| COMPANY A | XXXXX |
| COMPANY B | YYYYY |
| ⋮ | ⋮ |

FIG. 7

| CONTRACT NUMBER | COMPANY NAME |
|---|---|
| 5001 | COMPANY A |
| 5002 | COMPANY B |
| 5003 | COMPANY A |
| ⋮ | ⋮ |

FIG. 8

| CONTRACT NUMBER | DEVICE MANAGEMENT NUMBER | MODEL | FIRMWARE INFORMATION |
|---|---|---|---|
| 5001 | 10001 | RX2530M2 | V1.1 |
| 5001 | 10002 | RX2540M2 | V1.1 |
| 5002 | 10001 | RX2530M2 | V1.1 |
| 5002 | 10002 | RX2540M2 | V1.1 |
| 5003 | 10001 | RX2530M2 | V1.1 |
| 5003 | 10002 | RX2540M2 | V1.1 |
| ⋮ | ⋮ | ⋮ | ⋮ |

MANAGEMENT APPARATUS, MANAGEMENT METHOD, AND MANAGEMENT SYSTEM

CROSS-REFERENCE TO RELATED APPLICATION

This application is based upon and claims the benefit of priority of the prior Japanese Patent Application No. 2018-151460, filed on Aug. 10, 2018, the entire contents of which are incorporated herein by reference.

FIELD

The embodiment discussed herein is related to a management apparatus, a management method, and a management system.

BACKGROUND

In recent years, it has been a general practice to deposit devices such as a server, a switch, and a storage in a datacenter. There have been increasing cases in which devices are deposited in a plurality of datacenters for security and risk management for disasters and the like. When the devices are deposited in the plurality of datacenters, management of the deposited devices is performed by a datacenter administrator who is an administrator for a user in each of the datacenters. The user includes a customer having, for example, an individual contract or a collective contract of a company or the like.

When firmware is updated, the datacenter administrator performs firmware management for downloading firmware of a new version of a device from a Web site or the like of a firmware provider and applying the firmware to the device. The firmware is firmware incorporated in the switch and the storage. In the case of the server, the firmware is software such as a basic input output system (BIOS) or a baseboard controller.

The datacenter administrator often desires to use a stable environment as it is. Newly released firmware is likely to include bugs. The datacenter administrator determines, based on correction information and the like of the firmware, whether update of the firmware is performed. Correction of the firmware is often performed to cope with a trouble that occurs in a specific combination of hardware and an OS. The datacenter administrator determines, in every release of firmware, firmware of which device is updated.

There is a network device that, when firmware is updated, transmits a version number of the firmware to another network device and, on the other hand, receives a version number of firmware of the other network device and when changing the firmware, receives the firmware from the other network device and incorporates the firmware. The network device may facilitate the update of the firmware and facilitate management of the firmware.

There is a technique for storing change information of firmware during release of a machine allocated to a user, setting the changed firmware in the machine when there is the change information during allocation of the machine to the user, and sets default firmware in the machine when there is no change information. With the technique, a machine providing system that provides the machine to the user may provide a machine in which firmware corresponding to the user is set. As related art, for example, Japanese Laid-open Patent Publication No. 2011-95950 and International Publication Pamphlet No. WO 2015/001614 are disclosed.

The datacenter administrator may refer to information concerning firmware of a device of the datacenter administered by the datacenter administrator but is unable to refer to information concerning firmware of devices of other datacenters. Therefore, the datacenter administrator is unable to determine update of the firmware based on the information concerning the firmware of the devices of the other datacenters. In view of the above, it is desirable that the update of the firmware may be performed based on information concerning firmware of devices of a plurality of datacenters.

SUMMARY

According to an aspect of the embodiments, an apparatus includes a memory configured to store, for each setting place, identification information for identifying an attribute of a device and device information for associating the identification information, a model of the device, and firmware version information of the device; and a processor coupled to the memory and configured to: specify, for each setting place, firmware version information of a same model among devices included in the device information associated with one kind of the identification information based on the identification information and the device information stored in the memory, and execute update processing of firmware of the device of the same model based on the specified firmware version information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a device information DB;

FIG. 4 is a diagram illustrating a user information DB;

FIG. 6 is a diagram illustrating an example of company information DB;

FIG. 7 is a diagram illustrating an example of a user information DB;

FIG. 8 is a diagram illustrating an example of a device information DB;

FIGS. 11A-1, 11A-2 and 11A-3 are first diagrams illustrating a sequence of processing for updating firmware from the management apparatus;

FIGS. 11B-1, 11B-2 and 11B-3 are second diagrams illustrating the sequence of the processing for updating the firmware from the management apparatus;

FIGS. 12A-1, 12A-2 and 12A-3 are first diagrams illustrating a sequence of processing for updating firmware from the device management apparatus;

FIGS. 12B-1, 12B-2 and 12B-3 are second diagrams illustrating the sequence of the processing for updating the firmware from the device management apparatus;

FIGS. 12C-1, 12C-2 and 12C-3 are third diagrams illustrating the sequence of the processing for updating the firmware from the device management apparatus;

FIGS. 12D-1, 12D-2 and 12D-3 are fourth diagrams illustrating the sequence of the processing for updating the firmware from the device management apparatus.

DESCRIPTION OF EMBODIMENTS

An embodiment of a management apparatus, a management method, and a management system disclosed by this application is explained in detail below with reference to the drawings. This embodiment does not limit the disclosed technique.

Embodiment

Figure 1:
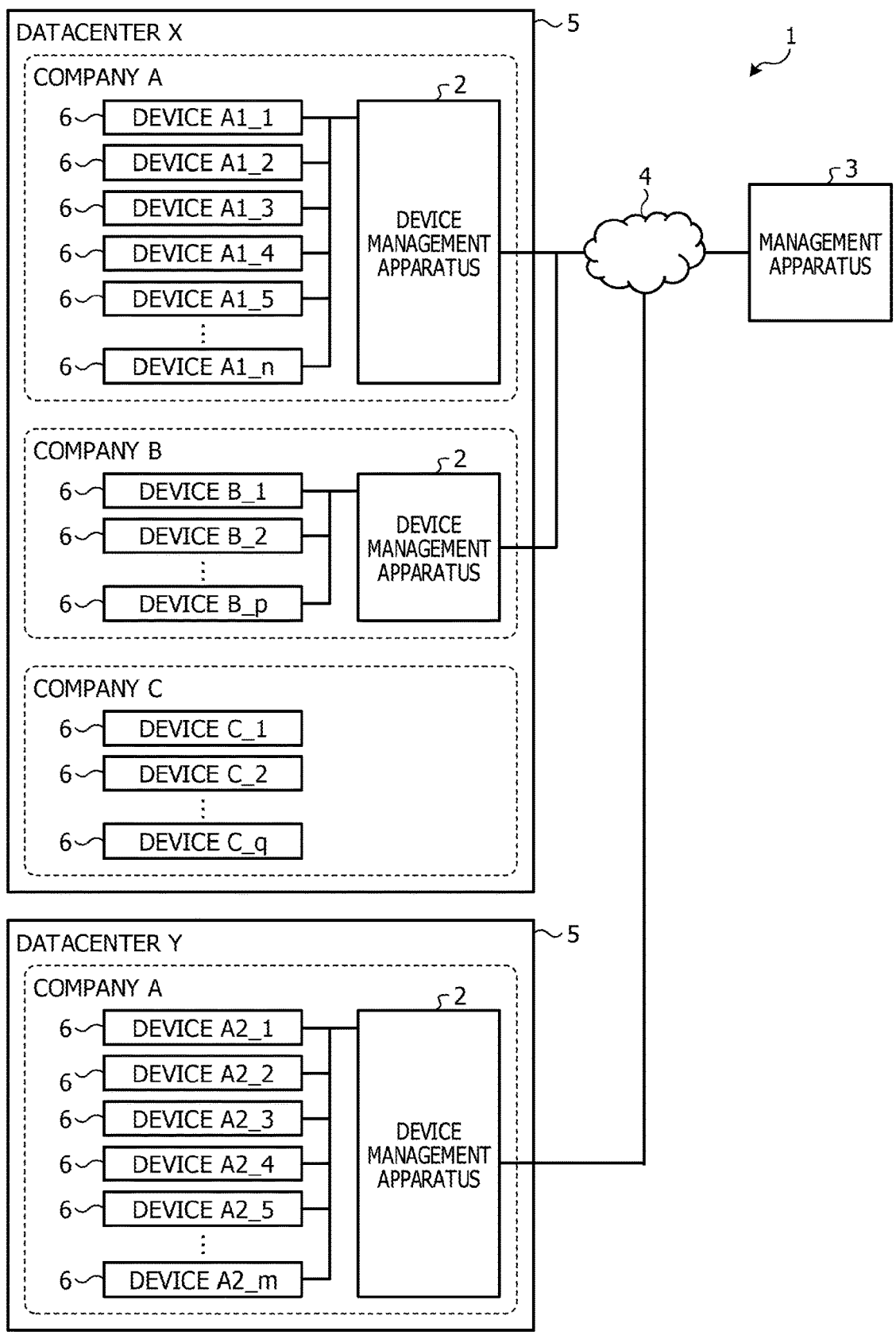
FIG. 1 is a diagram illustrating the configuration of a management system according to an embodiment.

First, the configuration of a management system according to an embodiment is explained. FIG. 1 is a diagram illustrating the configuration of the management system according to the embodiment. As illustrated in FIG. 1, a management system 1 according to the embodiment includes three device management apparatuses 2 and a management apparatus 3. The three device management apparatuses 2 and the management apparatus 3 are connected by a network 4.

The device management apparatus 2 is disposed for each user in a datacenter 5. The user disposes the device management apparatus 2 in each datacenter 5. For example, the device management apparatuses 2 of a company A and a company B are disposed in a datacenter X. The device management apparatus 2 of the company A is disposed in a datacenter Y as well.

The device management apparatuses 2 of the companies are systems that monitor devices 6 including firmware deposited in the datacenter 5. The company A deposits the devices 6 represented by devices A1_1 to A1_*n* in the datacenter X. The device management apparatus 2 of the company A in the datacenter X manages the devices A1_1 to A1_*n* and firmware of the devices A1_1 to A1_*n*. The company A also deposits the devices 6 represented by devices A2_1 to A2_*m* in the datacenter Y. The device management apparatus 2 of the company A in the datacenter Y manages the devices A2_1 to A2_*m* and firmware of the devices A2_1 to A2_*m*.

The company B deposits the devices 6 represented by devices B_1 to B_p in the datacenter X. The device management apparatus 2 of the company B in the datacenter X manages the devices B_1 to B_p and firmware of the devices B_1 to B_p. The company C deposits the devices 6 represented by devices C_1 to C_q in the datacenter X. However, the company C does not dispose the device management apparatus 2 in the datacenter X.

For convenience of explanation, only two datacenters 5 are illustrated. However, more datacenters 5 may be present. The company A may deposit the devices 6 in three or more datacenters 5 and dispose the device management apparatuses 2 in the three or more datacenters 5. Users of four or more companies may deposit the devices 6 in one datacenter 5.

The management apparatus 3 is an apparatus that manages information concerning the users, information concerning the devices 6, information concerning the firmware, and the firmware targeting all the datacenters 5. The management apparatus 3 collects contracts with the users and the information concerning the devices 6 from the device management apparatuses 2 and manages the contracts and the information and gives an update instruction for the firmware to the device management apparatuses 2. An operator (including a user authority owner (for example, a system engineer)) may refer to the information concerning the firmware of the devices 6 of a plurality of datacenters 5 from the management apparatus 3 and may give an update instruction for the firmware to the device management apparatuses 2 from the management apparatus 3.

Figure 2:
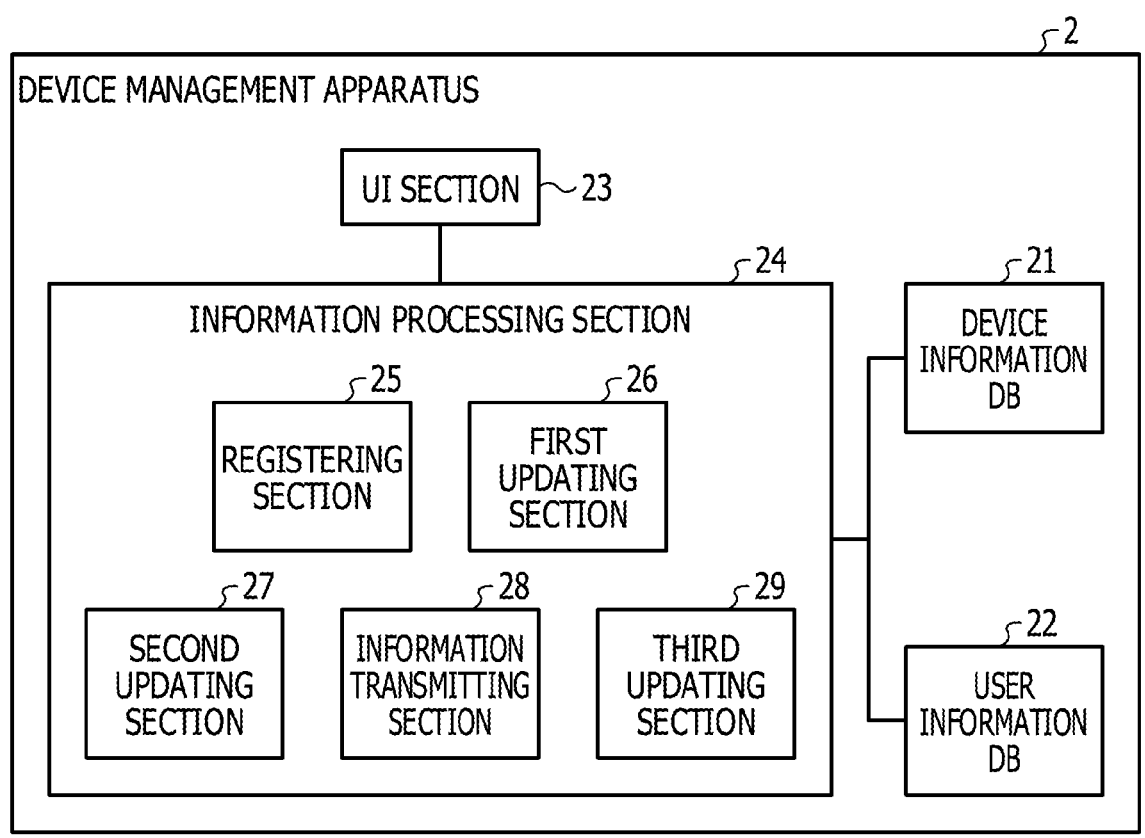
FIG. 2 is a diagram illustrating a functional configuration of a device management apparatus.

FIG. 2 is a diagram illustrating a functional configuration of the device management apparatus 2. As illustrated in FIG. 2, the device management apparatus 2 includes a device information DB 21, a user information DB 22, a UI section 23, and an information processing section 24.

The device information DB 21 stores, as device information, the information concerning the devices 6 including the information concerning the firmware managed by the device management apparatuses 2. FIG. 3 is a diagram illustrating an example of the device information DB 21. As illustrated in FIG. 3, the device information DB 21 stores a device management number, a model, and firmware information for each device 6. The device management number is a number for identifying the device 6. The model is an identifier indicating a type of the device 6. The firmware information is an identifier indicating version information (a version number) of the firmware of the device 6. For example, a type of the device 6 identified by "10001" is "RX2530M2" and version information of the firmware of the device 6 is "V1.1".

The user information DB 22 stores user information. FIG. 4 is a diagram illustrating an example of the user information DB 22. As illustrated in FIG. 4, the user information DB 22 stores a company name and a contract number. The company name is a name for identifying a user having a contract. The contract number is a number for identifying the contract. The contract number is issued to the user in which the device management apparatus 2 is set. For example, the "company A" has a contract identified by "5001".

When interacting with the datacenter administrator, the UI section 23 performs display on a display device and receives an input from an input device such as a keyboard, a mouse, or a touch sensor. For example, the UI section 23 receives user registration from the datacenter administrator and displays a received result. The UI section 23 receives an update instruction for firmware from the datacenter administrator and displays an update result.

The information processing section 24 performs processing concerning registration of a user and update of firmware using the device information DB 21 and the user information DB 22. The information processing section 24 includes a registering section 25, a first updating section 26, a second updating section 27, an information transmitting section 28, and a third updating section 29.

The registering section 25 receives a company name and a contract number as user information from the datacenter administrator via the UI section 23 and stores the user information in the user information DB 22. The registering section 25 notifies the received user information to the management apparatus 3.

When the management apparatus 3 receives an update instruction for firmware, the first updating section 26 downloads the firmware from the management apparatus 3 based on the instruction from the management apparatus 3 and instructs the device 6 to update the firmware. The management apparatus 3 designates a model and version information of the update target in the update instruction.

The second updating section 27 performs the update of the firmware based on the update instruction received by the UI section 23. The second updating section 27 displays, via the UI section 23, version information of the firmware installed in the device 6 and latest version information, downloads firmware of the device 6 selected by the datacenter administrator from the management apparatus 3, and instructs the device 6 to update the firmware.

The information transmitting section 28 acquires version information of firmware from the devices 6 targeting all the devices 6 managed by the device management apparatus 2, updates the device information DB 21, and notifies the update to the management apparatus 3.

The third updating section 29 instructs, based on an update instruction by the management apparatus 3 based on version information transmitted by the information transmitting section 28 of the device management apparatus 2 of the same user of another datacenter 5, the device 6 to update firmware.

Figure 5:
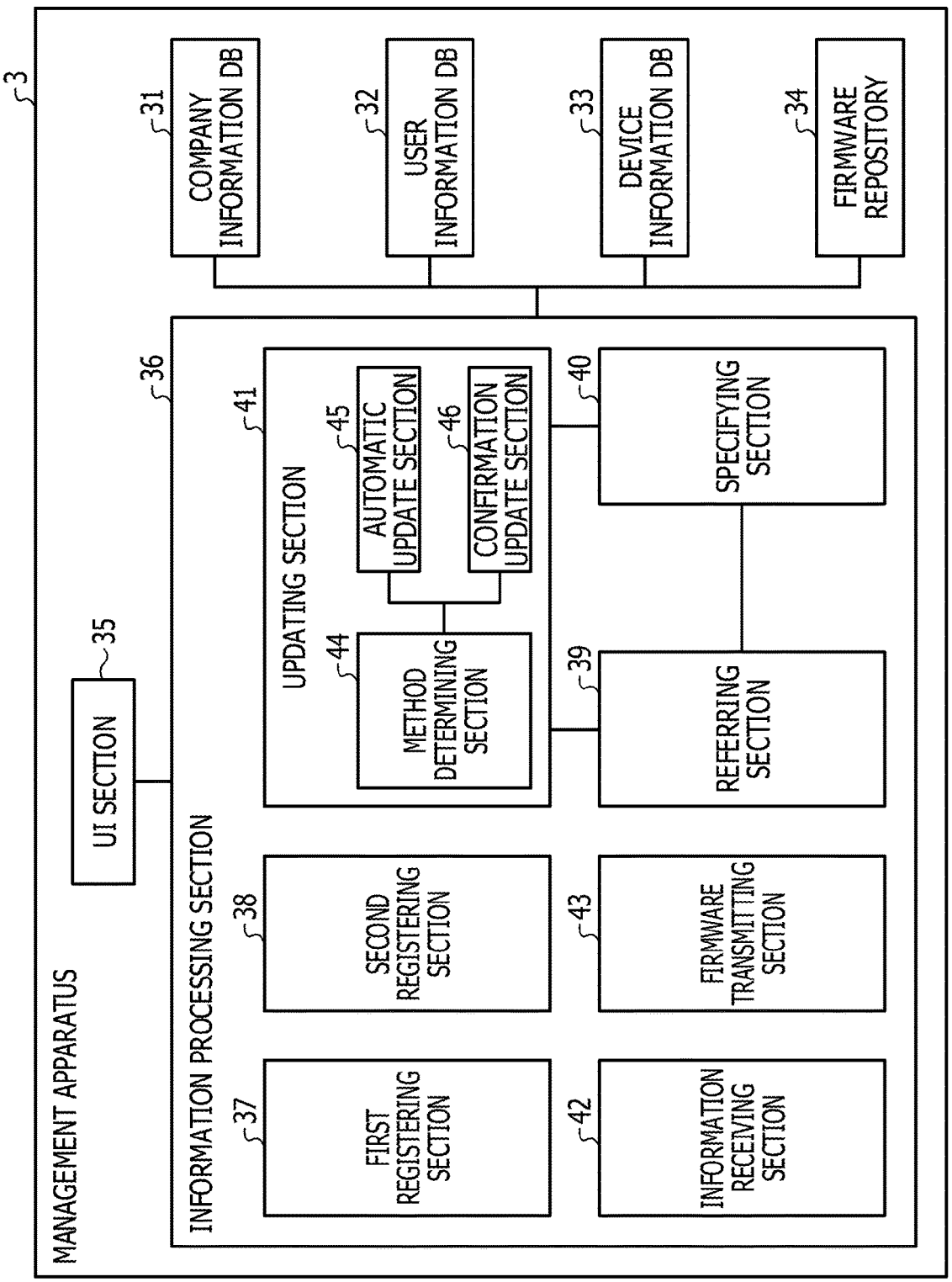
FIG. 5 is a diagram illustrating a functional configuration of a management apparatus.

FIG. 5 is a diagram illustrating a functional configuration of the management apparatus 3. As illustrated in FIG. 5, the management apparatus 3 includes a company information DB 31, a user information DB 32, a device information DB 33, a firmware repository 34, a UI section 35, and an information processing section 36.

The company information DB 31 stores company information. FIG. 6 is a diagram illustrating an example of the company information DB 31. As illustrated in FIG. 6, the company information DB 31 stores a company name and a company ID for each company (user) in association with each other. The company name is a name for identifying the company. The company ID is an identifier for identifying the company. For example, an identifier of a company having a name "company A" is "XXXXX".

The user information DB 32 stores user information. FIG. 7 is a diagram illustrating an example of the user information DB 32. As illustrated in FIG. 7, the user information DB 32 stores a contract number and a company name for each contract in association with each other. The contract number is a number for identifying the contract. The company name is a name for identifying a user having the contract.

The user information DB 32 includes information concerning contracts in the plurality of datacenters 5. Therefore, about a user that disposes the device management apparatuses 2 in the plurality of datacenters 5, a plurality of entries having different contract numbers are included in the user information DB 32. For example, the "company A" disposes the device management apparatuses 2 in the datacenter X and the datacenter Y. Therefore, about the "company A", entries concerning two contracts identified by "5001" and "5003" are included in the user information DB 32.

The device information DB 33 stores, about all the device management apparatuses 2, that is, for example, all contracts, information concerning the devices 6 and the firmware managed by the device management apparatuses 2. FIG. 8 is a diagram illustrating an example of the device information DB 33. As illustrated in FIG. 8, the device information DB 33 stores, for each device 6, a contract number, a device management number, a model, and firmware information.

Compared with when the device information DB 21 stores only information concerning one contract, since the device information DB 33 stores the information concerning all the contracts, contract numbers are included in the stored information. For example, when information concerning the device 6 identified by "10001" is sent from the device management apparatus 2 of the "company A" in the datacenter X, the device information DB 33 stores information added with a contract number "5001" of the "company A".

The firmware repository 34 stores, targeting all the datacenters 5, all version information and firmware of all versions about the firmware of all the devices 6 deposited in the datacenter 5.

When interacting with a device administrator who administers the devices 6 deposited in the datacenter 5 in the company, the UI section 35 performs display on a display device and receives an input from an input device such as a keyboard, a mouse, or a touch sensor. For example, the UI section 35 receives company registration from the device administrator and displays a received result. The UI section 35 receives a reference information to firmware of the company from the device administrator and displays a reference result. The UI section 35 receives an update instruction for firmware of the company from the device administrator and displays an update result.

The information processing section 36 performs processing for registration of a user and update of firmware using the company information DB 31, the user information DB 32, the device information DB 33, and the firmware repository 34. The information processing section 36 includes a first registering section 37, a second registering section 38, a referring section 39, a specifying section 40, an updating section 41, an information receiving section 42, and a firmware transmitting section 43.

The first registering section 37 receives a registration request for a company via the UI section 35 and registers a company name and a company ID in the company information DB 31. The first registering section 37 displays a registration result of the company via the UI section 35.

The second registering section 38 receives user information from the device management apparatus 2 and registers the user information in the user information DB 32. The second registering section 38 transmits a registration result to the device management apparatus 2.

The referring section 39 receives a reference request to firmware via the UI section 35, designates a company ID received from the UI section 35, and requests the specifying section 40 to specify firmware for each model of the user. The referring section 39 displays, via the UI section 35, information concerning the firmware specified for each model by the specifying section 40.

When receiving a display request together with a company ID from a confirmation update section 46 explained below, the referring section 39 also requests the specifying section 40 to specify firmware for each model of the user and displays, via the UI section 35, information concerning the firmware specified for each model.

The specifying section 40 specifies firmware of the user using the company information DB 31, the user information DB 32, and the device information DB 33 and returns information concerning the specified firmware. Specifically, for example, the specifying section 40 retrieves a company name from the company ID using the user information DB 32 and retrieves a contract number from the retrieved company name using the user information DB 32. The specifying section 40 specifies a model and firmware information of the device 6 deposited by the user from the contract number using the device information DB 33.

About a user that deposits the devices 6 of the same model in the plurality of datacenters 5, the specifying section 40 retrieves a plurality of contract numbers and specifies firmware information respectively corresponding to the plurality of contract numbers about the same model. At this time, versions are sometimes different in a plurality of kinds of firmware information specified about the same model.

The updating section 41 receives an update instruction for firmware via the UI section 35 and performs automatic update or confirmation update based on setting. The automatic update is, when versions of firmware of the devices 6 deposited in the plurality of datacenters 5 by the user are different and a ratio of latest version a is equal to or larger than a predetermined threshold, updating the firmware of all the devices 6 to the version a.

The confirmation update is displaying firmware information of the devices 6 deposited in the plurality of datacenters 5 by the user and updating the firmware based on the device 6 and a version selected by the device administrator. Setting concerning whether the automatic update is performed or the confirmation update is performed is performed by the device administrator. The updating section 41 displays an update result via the UI section 35.

The updating section 41 includes a method determining section 44, an automatic update section 45, and a confirmation update section 46. The method determining section 44 determines based on the setting whether the automatic update is performed or the confirmation update is performed.

When the method determining section 44 determines that the automatic update is performed, the automatic update section 45 designates a user and requests the specifying section 40 to specify firmware for each model. About models, a ratio of the latest version a of which is equal to or larger than the predetermined threshold, the automatic update section 45 updates all kinds of firmware to the version a.

When the method determining section 44 determines that the confirmation update is performed, the confirmation update section 46 designates a company ID and causes the referring section 39 to display firmware information for each model. The confirmation update section 46 updates the firmware based on a model and a version selected by the device administrator.

When receiving update information of firmware from the device management apparatus 2, the information receiving section 42 specifies the device 6 having old version of firmware among the devices 6 of the same model present in the other datacenters 5 using the user information DB 32 and the device information DB 33. The information receiving section 42 updates firmware of the specified device 6 to the latest version.

The firmware transmitting section 43 acquires firmware from the firmware repository 34 and transmits the firmware to the device management apparatus 2 based on a transmission request from the device management apparatus 2.

Figure 9:
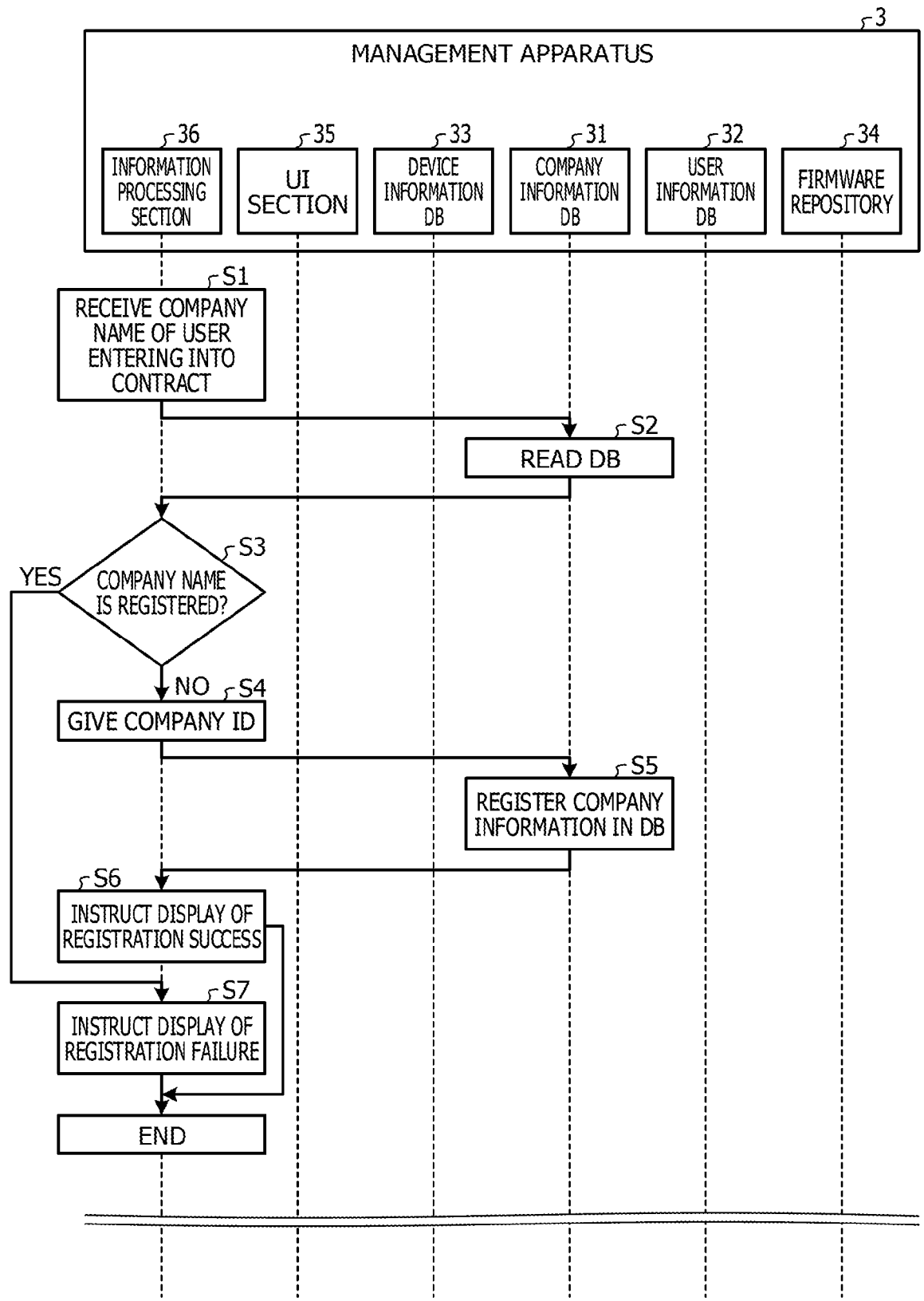
FIG. 9 is a diagram illustrating a sequence of processing for registering company information.

Sequences of processing by the management system 1 are explained with reference to FIGS. 9 to 12D. FIG. 9 is a diagram illustrating a sequence of processing for registering company information. As illustrated in FIG. 9, the information processing section 36 of the management apparatus 3 receives, via the UI section 35, a company name of a user entering into a contract (S1). The information processing section 36 reads the company information DB 31 (S2) and determines whether the received company name is registered (S3).

When the received company name is not registered, the information processing section 36 gives a company ID to the user (S4) and registers company information in the company information DB 31 (S5). The information processing section 36 instructs the UI section 35 to display registration success (S6). On the other hand, when the received company name is registered, the information processing section 36 instructs the UI section 35 to display registration failure (S7).

In this way, the information processing section 36 may associate the company ID and the company name by registering the company information in the company information DB 31.

Figure 10A:
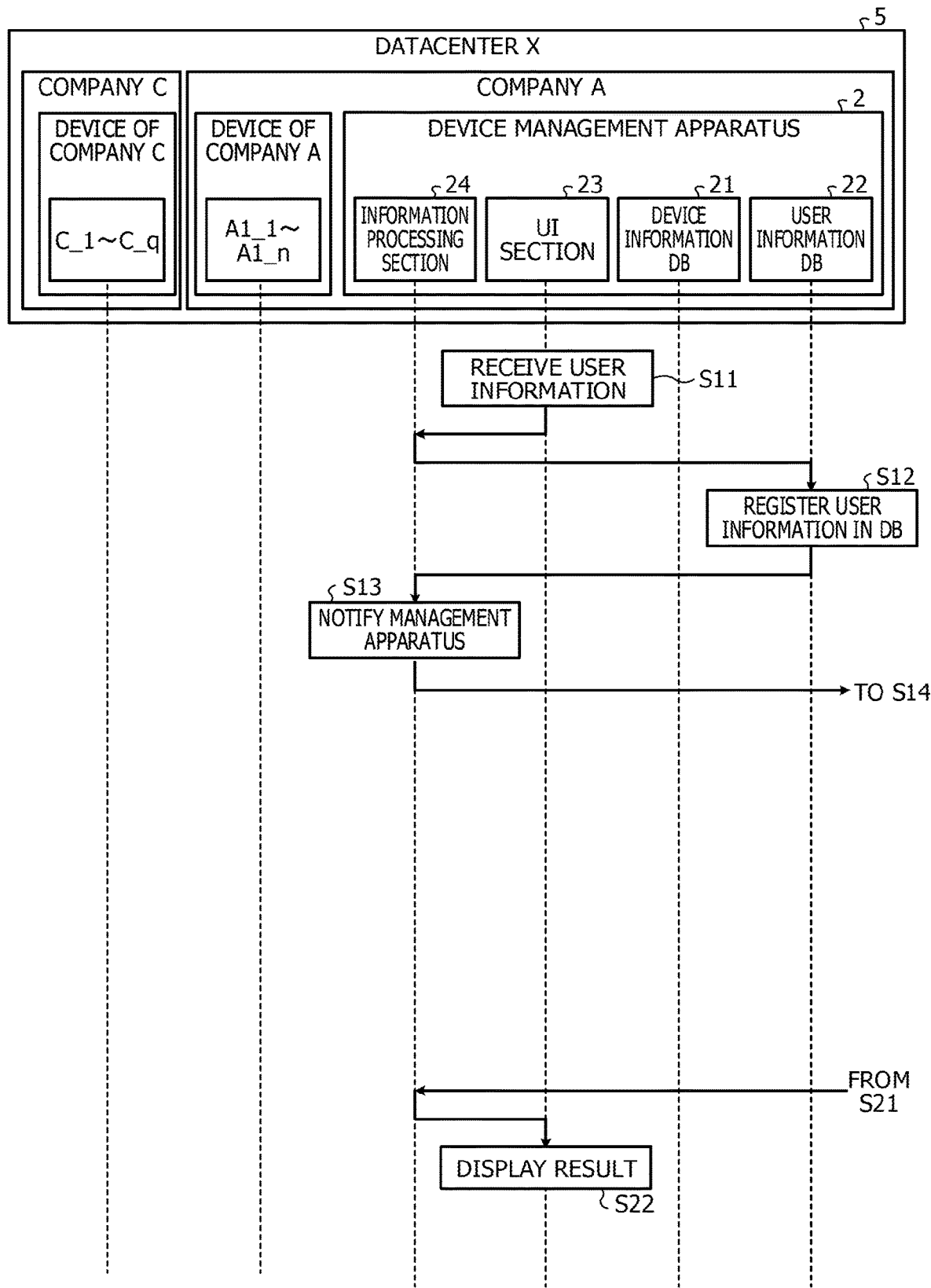
FIGS. 10A and 10B are diagrams illustrating a sequence of processing for registering user information.
Figure 10B:
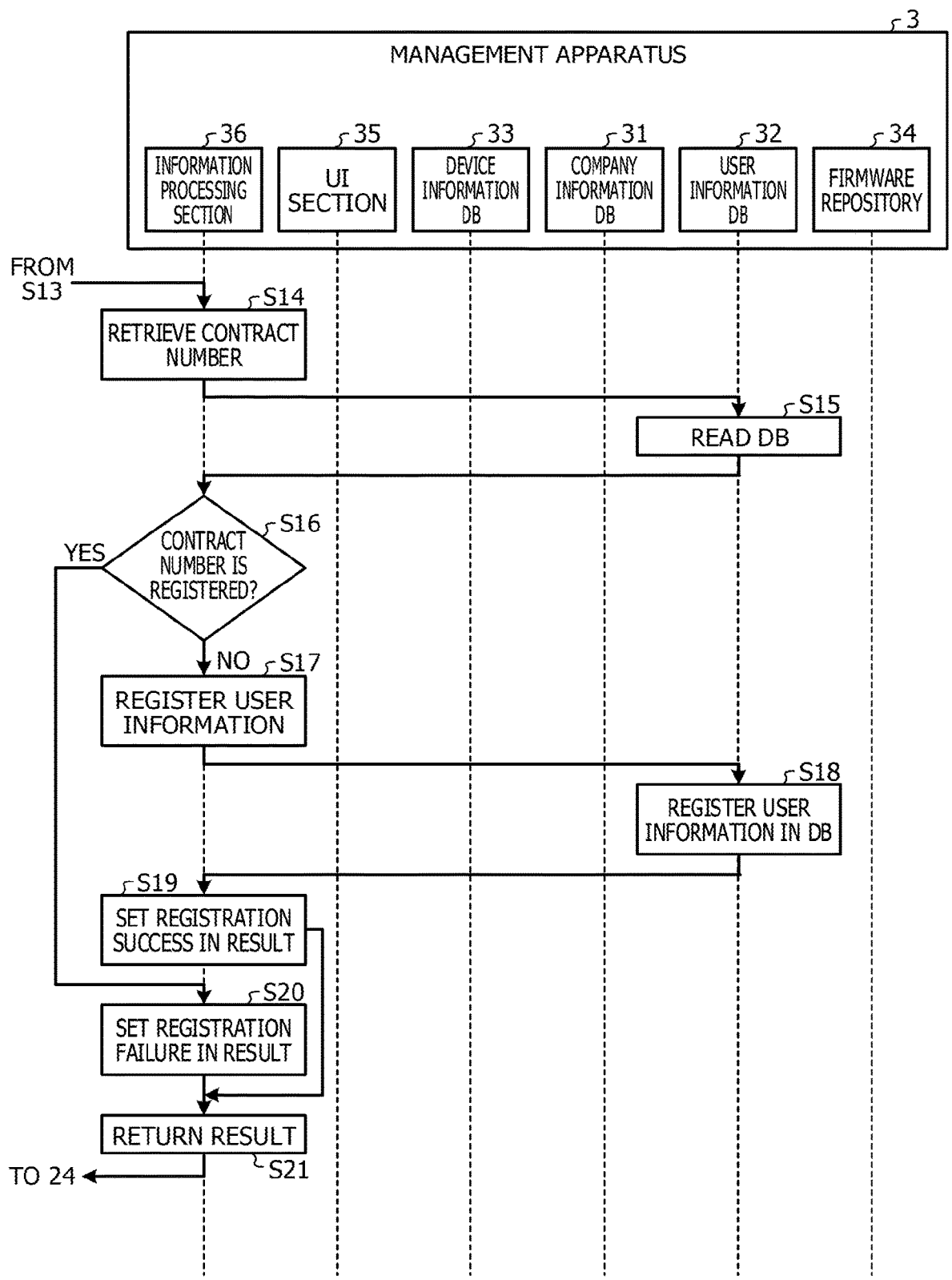

FIGS. 10A and 10B are diagrams illustrating a sequence of processing for registering user information. As illustrated in FIG. 10A, the UI section 23 of the device management apparatus 2 receives user information (S11) and passes the user information to the information processing section 24. The information processing section 24 registers the user information in the user information DB 22 (S12). The information processing section 24 notifies the user information to the management apparatus 3 (S13).

As illustrated in FIG. 10B, the information processing section 36 of the management apparatus 3 retrieves a contract number included in the user information (S14). That is, for example, the information processing section 36 reads the user information DB 32 (S15) and determines whether the contract number is registered in the user information DB 32 (S16).

When the contract number is not registered in the user information DB 32, the information processing section 36 registers the user information (S17). That is, for example, the information processing section 36 registers the user information in the user information DB 32 (S18). The information processing section 36 sets registration success in a result (S19) and shifts to S21. On the other hand, when the contract number is registered in the user information DB 32, the information processing section 36 sets registration failure in the result (S20).

The information processing section 36 returns the result to the device management apparatus 2 (S21). The information processing section 24 of the device management apparatus 2 instructs the UI section 23 to display the result. The UI section 23 displays the result (S22).

In this way, the information processing section 36 may associate the contract number and the company name by registering the user information in the user information DB 32.

Figures 1, 11A:
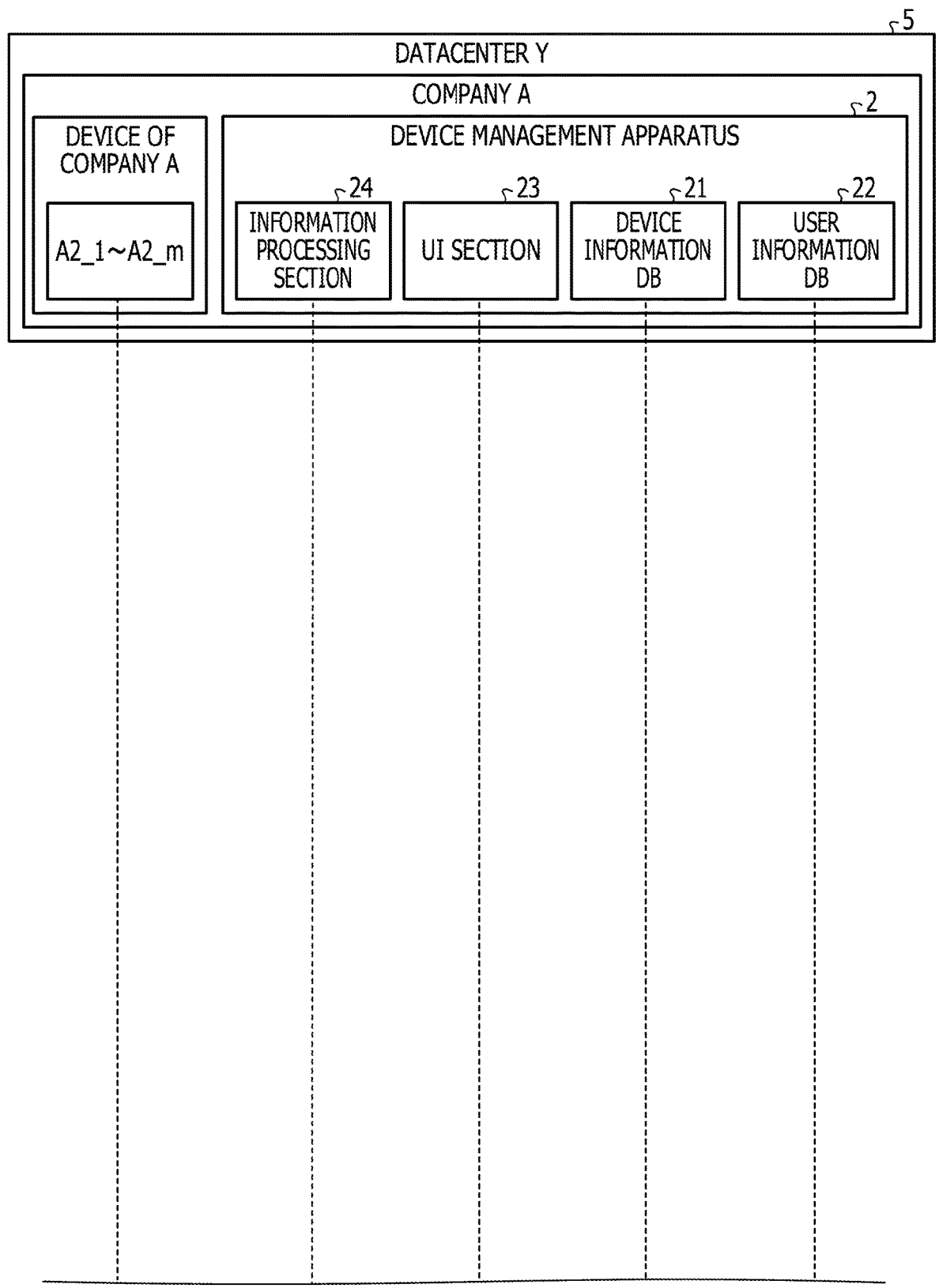
Figures 2, 11A:
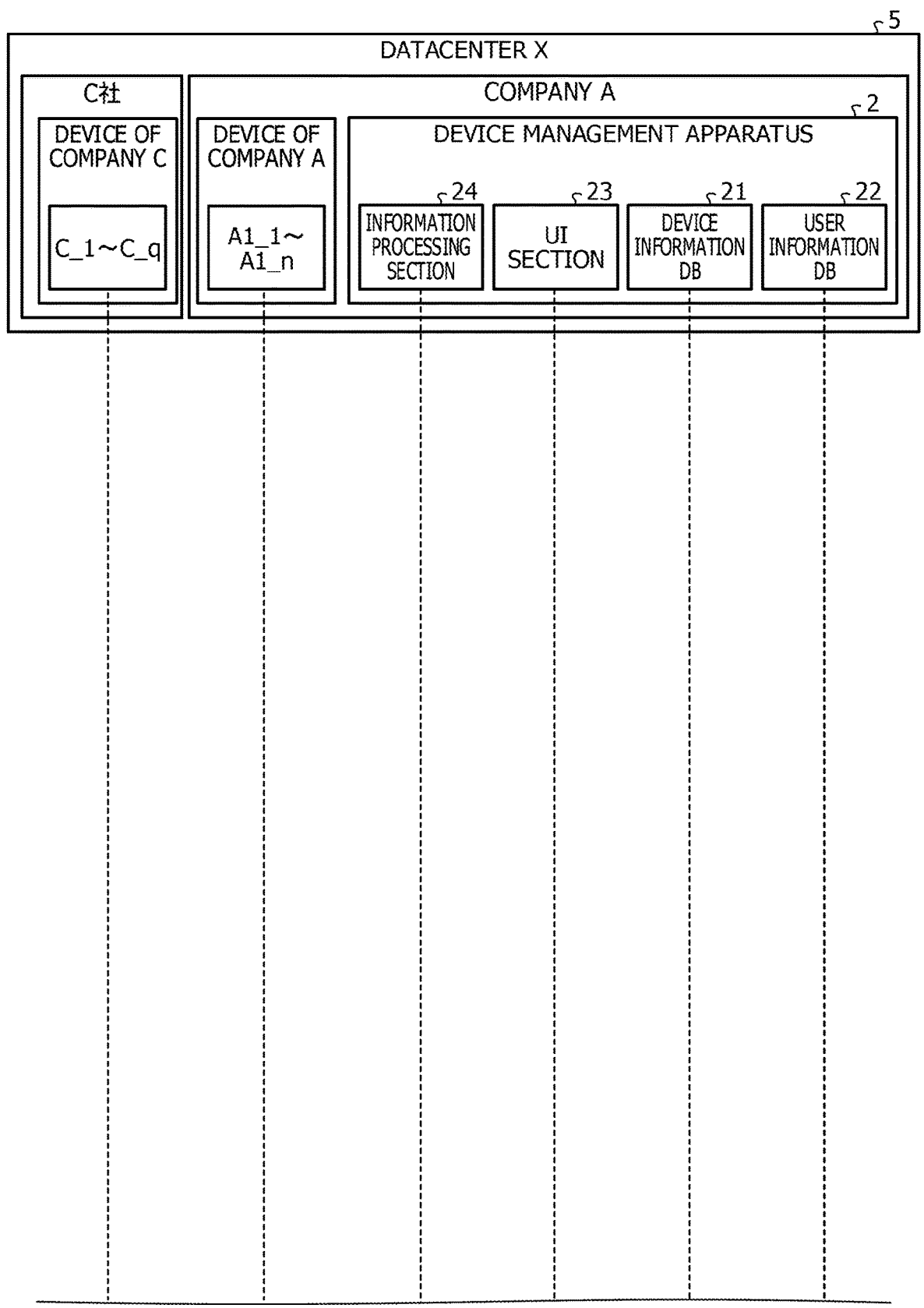
Figures 3, 11A:
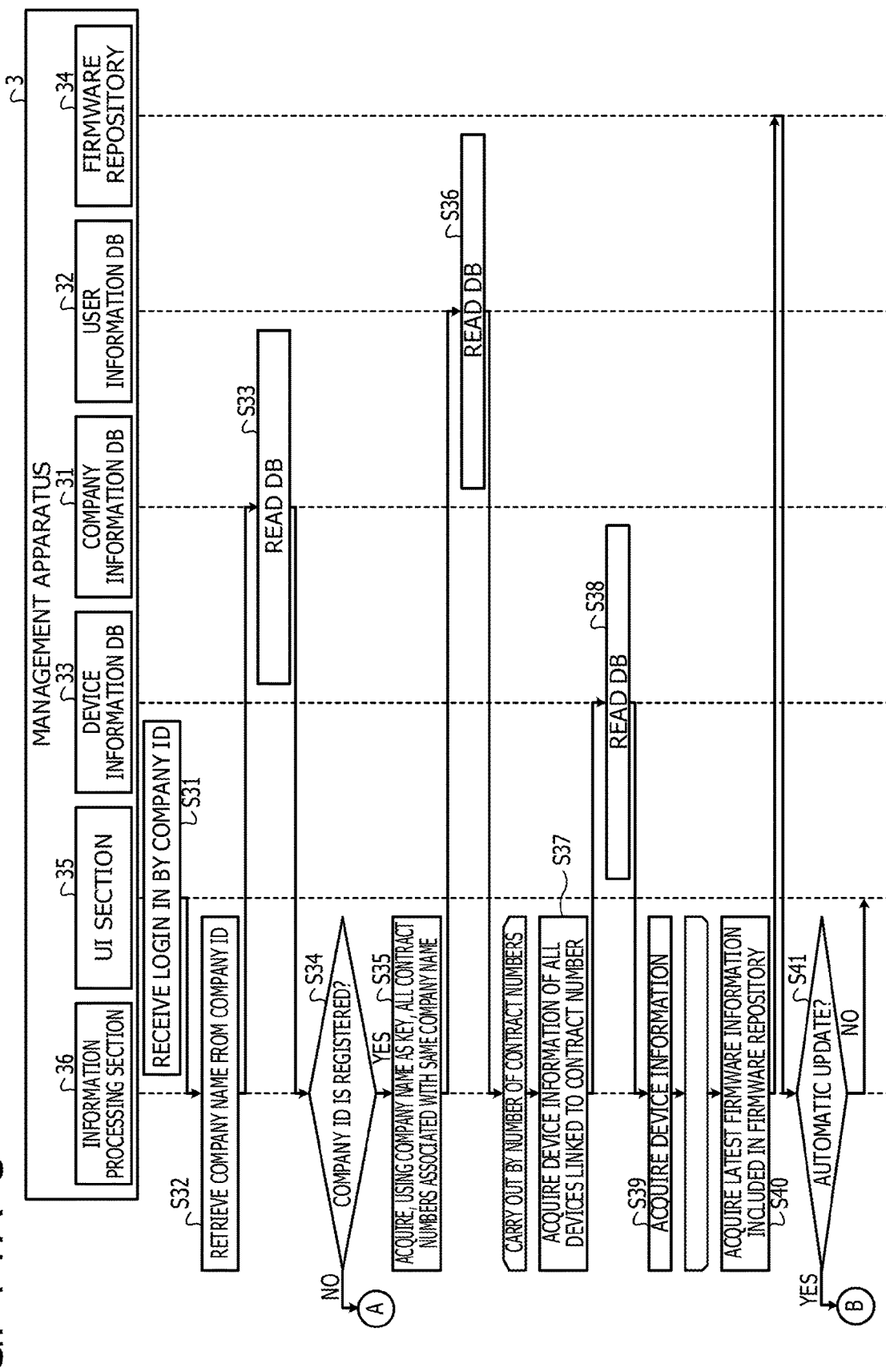

FIGS. 11A-1, 11A-2 and 11A-3 are first diagrams illustrating a sequence of processing for updating firmware from the management apparatus 3. FIGS. 11B-1, 11B-2 and 11B-3 are second diagrams illustrating the sequence of the processing for updating the firmware from the management apparatus 3. As illustrated in FIG. 11A-3, the UI section 35 of the management apparatus 3 receives login by a company ID by the device administrator (S31) and passes the company ID to the information processing section 36.

The information processing section 36 retrieves a company name from the company ID using the company information DB 31 (S32). That is, for example, the information processing section 36 reads the company information DB 31 (S33) and determines whether the company ID is registered in the company information DB 31 (S34).

When the company ID is registered in the company information DB 31, the information processing section 36 acquires, using the company name as a key, all contract numbers associated with the same company name (S35). That is, for example, the information processing section 36 reads the user information DB 32 (S36) and acquires all contract numbers associated with the same company name. The information processing section 36 repeats the following processing in S37 to S39 by the number of the contract numbers.

In S37 to S39, the information processing section 36 acquires device information of all the devices 6 linked to the contract numbers (S37). That is, for example, the information processing section 36 reads the device information DB 33 (S38) and acquires device information (S39).

Figures 1, 11B:
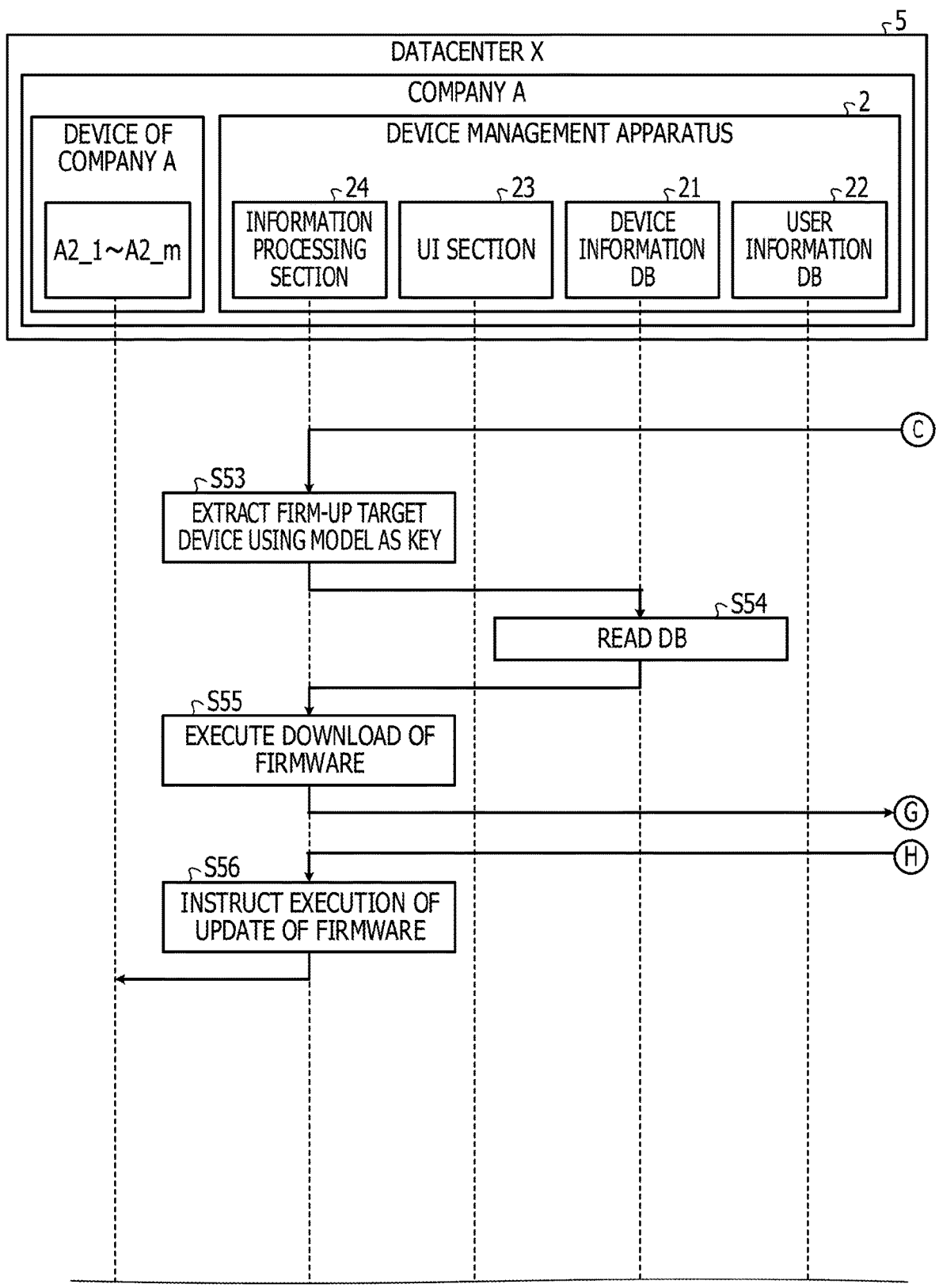
Figures 2, 11B:
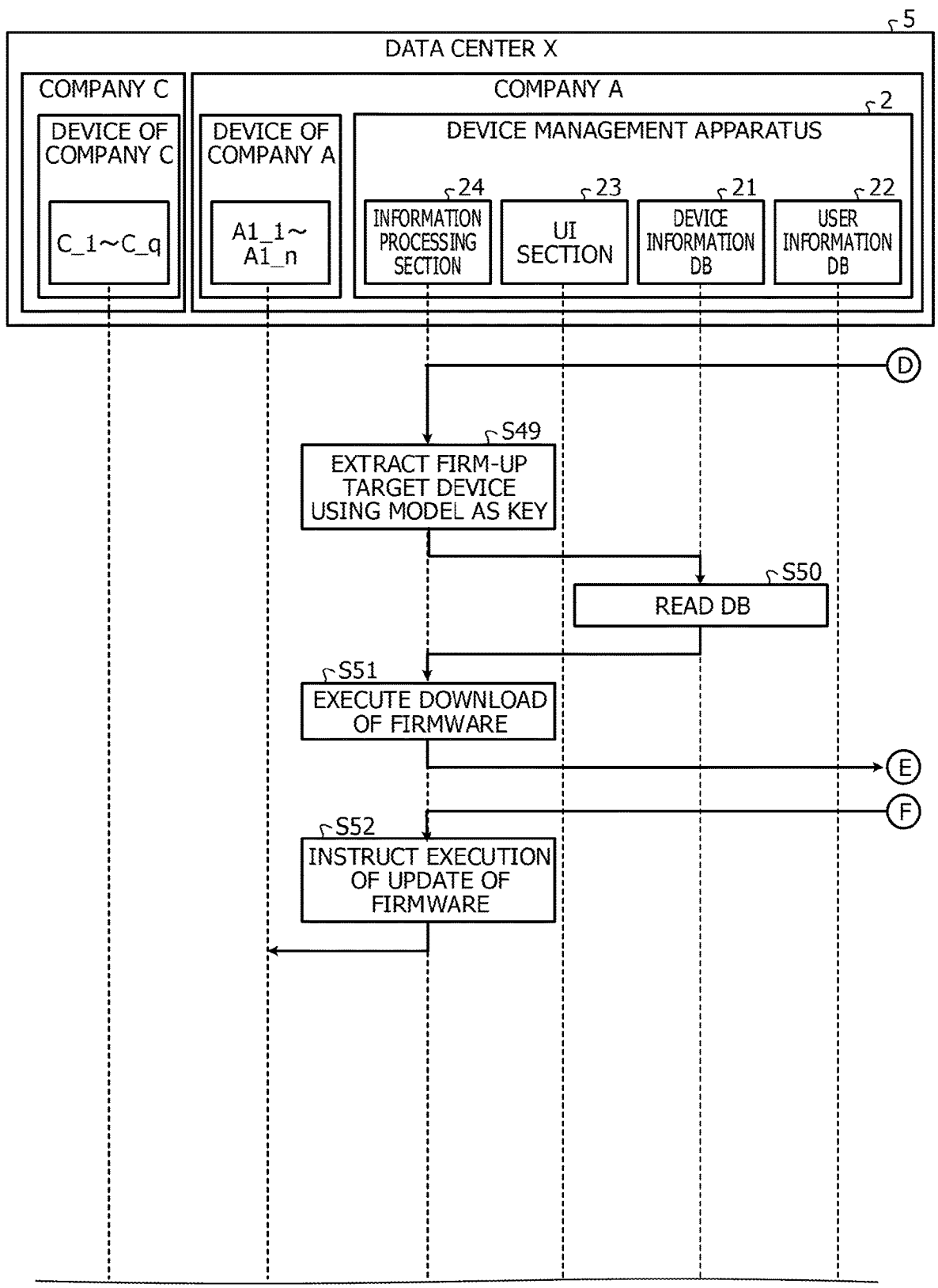
Figures 3, 11B:
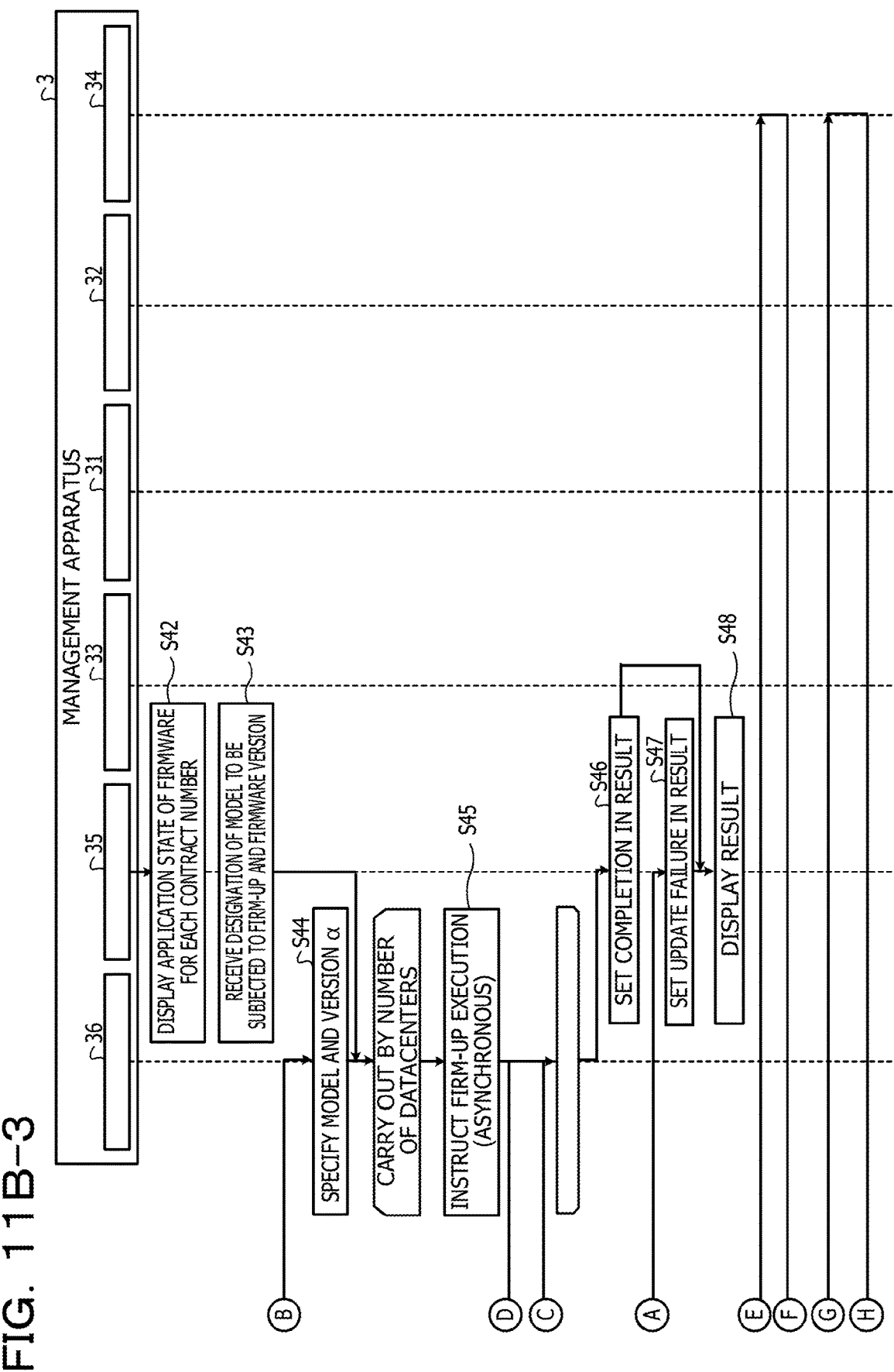

The information processing section 36 acquires the latest firmware information included in the firmware repository 34 (S40). The information processing section 36 determines, based on setting, whether the automatic update is performed (S41). When the automatic update is not performed, the UI section 35 displays, based on an instruction of the information processing section 36, an application state of firmware for each contract number as illustrated in FIG. 11B-3 (S42). The UI section 35 receives designation of a model to be subjected to firm-up and a firmware version from the device administrator (S43), passes received information to the information processing section 36, and shifts to S45. The firm-up is an abbreviation of firmware update.

On the other hand, when the automatic update is performed, the information processing section 36 specifies a model of the devices 6 of the version a, a ratio of the datacenters 5 including the devices 6 being equal to or larger than a predetermined threshold, and the version a (S44). The predetermined threshold is, for example, 65%.

The information processing section 36 repeats, by the number of the datacenters 5 where update is requested, processing for designating a model and a version and instructing firm-up execution (S45). The information processing section 36 sets completion in a result (S46) and shifts to S48.

On the other hand, when the company ID is not registered in the company information DB 31 in S34, the information processing section 36 sets update failure in the result (S47).

The UI section 35 displays the result based on an instruction of the information processing section 36 (S48).

For example, as illustrated in FIG. 11B-2, if the device 6 of the company A is an update target, the information processing section 24 of the device management apparatus 2 of the company A in the datacenter X receives an instruction for firm-up execution from the management apparatus 3 and extracts a firm-up target model using a model as a key (S49). That is, for example, the information processing section 24 reads the device information DB 21 (S50) and acquires the firm-up target model. The information processing section 24 designates a model and a version and executes download of firmware (S51) and instructs the device 6 to execute update of the firmware (S52). The device 6 executes the update of the firmware.

Similarly, as illustrated in FIG. 11B-1, the information processing section 24 of the device management apparatus 2 of the company A in the datacenter Y receives an instruction for firm-up execution from the management apparatus 3 and extracts a firm-up target model using a model as a key (S53). That is, for example, the information processing section 24 reads the device information DB 21 (S54) and acquires the firm-up target model. The information processing section 24 designates a model and a version and executes download of firmware (S55) and instructs the device 6 to execute update of the firmware (S56). The device 6 executes the update of the firmware.

When the company A deposits the devices 6 of the target model in the other datacenters 5 as well, the update of the firmware is executed in the other datacenters 5 in the same manner.

In this way, the device administrator may instruct, from the management apparatus 3, all the device management apparatuses 2 to update the firmware.

Figures 1, 12A:
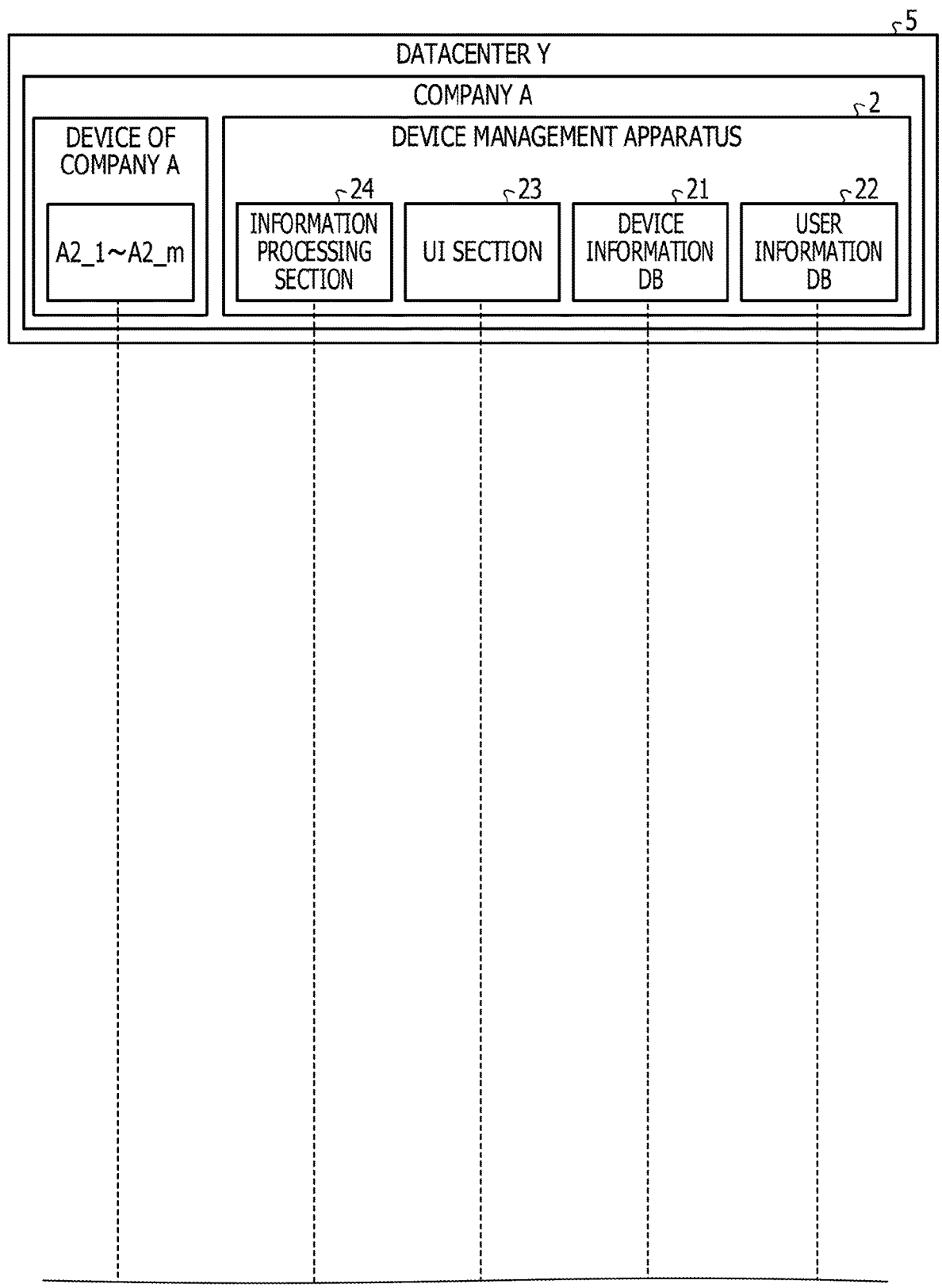
Figures 2, 12A:
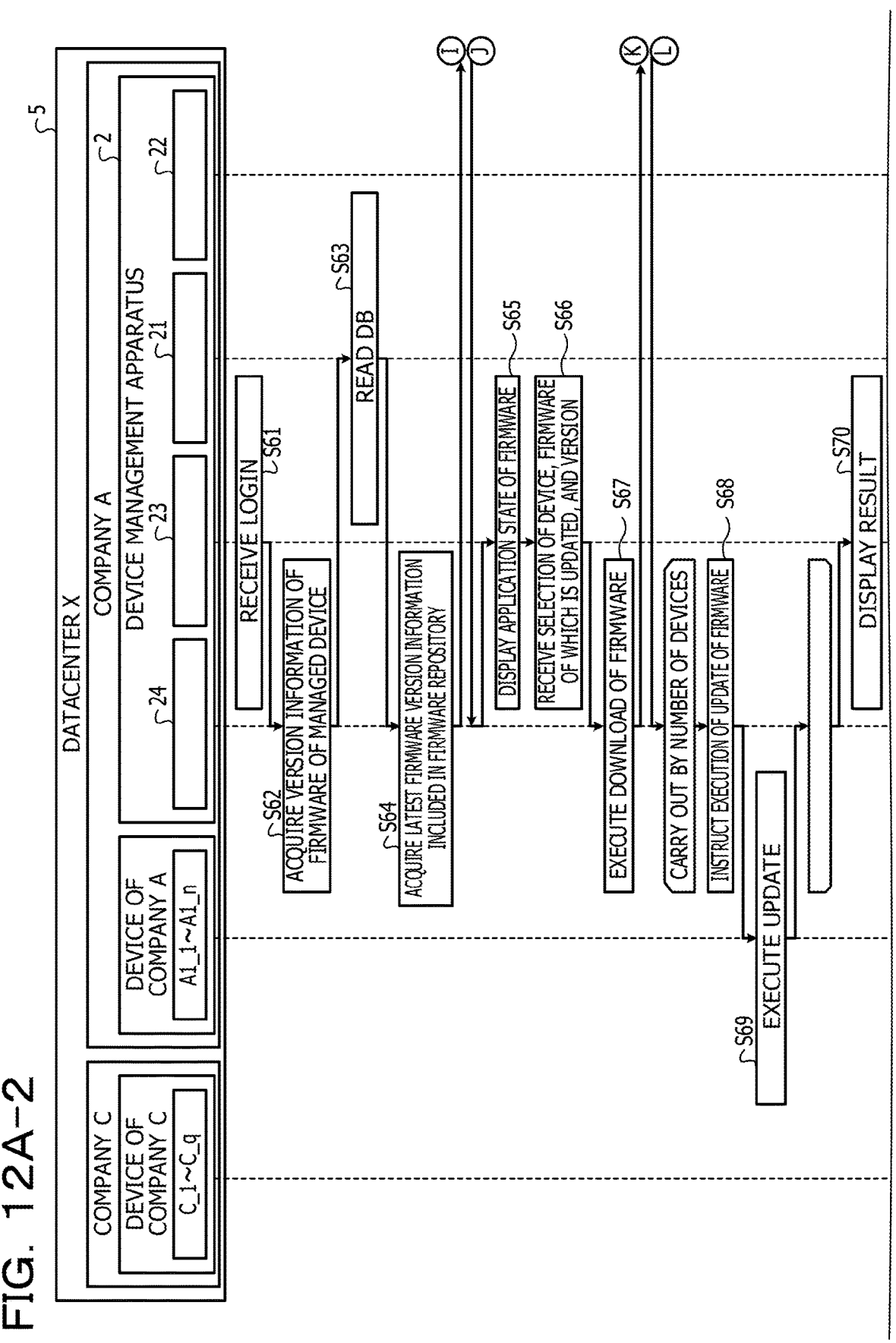
Figures 3, 12A:
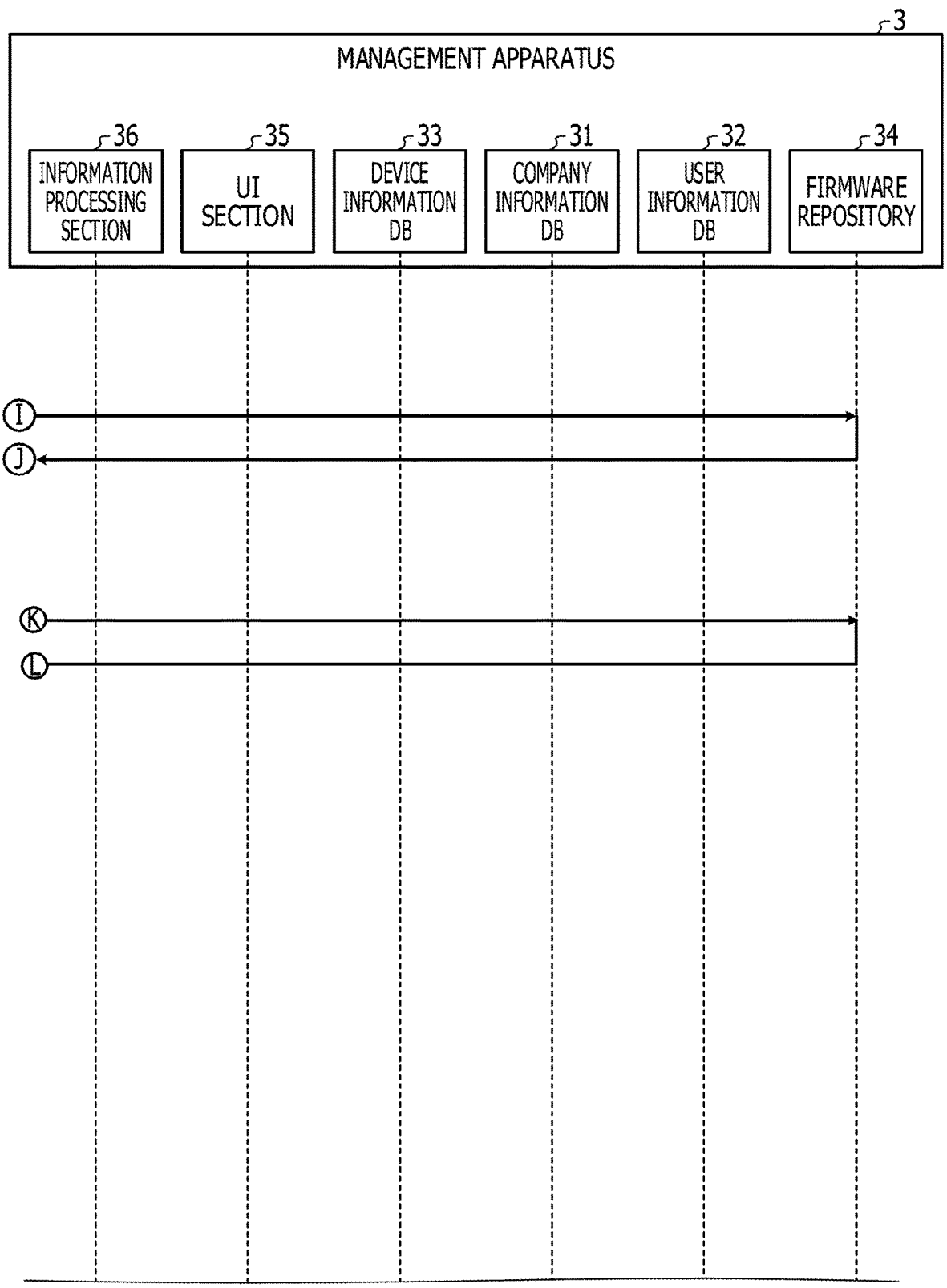

FIGS. 12A-1, 12A-2 and 12A-3 are first diagrams illustrating a sequence of processing for updating firmware from the device management apparatus 2. In the following explanation, the set of FIGS. 12A-1, 12A-2 and 12A-3 may be called "FIG. 12A". FIGS. 12B-1, 12B-2 and 12B-3 are second diagrams illustrating the sequence of the processing for updating the firmware from the device management apparatus 2. In the following explanation, the set of FIGS. 12B-1, 12B-2 and 12B-3 may be called "FIG. 12B". FIGS. 12C-1, 12C-2 and 12C-3 are third diagrams illustrating the sequence of the processing for updating the firmware from the device management apparatus 2. In the following explanation, the set of FIGS. 12C-1, 12C-2 and 12C-3 may be called "FIG. 12C". FIGS. 12D-1, 12D-2 and 12D-3 are fourth diagrams illustrating the sequence of the processing for updating the firmware from the device management apparatus 2. In the following explanation, the set of FIGS. 12D-1, 12D-2 and 12D-3 may be called "FIG. 12D". As illustrated in FIG. 12A-2, the UI section 23 of the device management apparatus 2 receives login by the datacenter administrator (S61) and notifies the login to the information processing section 24.

The information processing section 24 acquires version information of firmware of the device 6 managed by the information processing section 24 (S62). That is, for example, the information processing section 24 reads the device information DB 21 (S63) and acquires the version information of the firmware of the managed device 6. The information processing section 24 acquires information concerning the latest firmware version included in the firmware repository 34 (S64).

The UI section 23 displays an application state of the firmware based on an instruction of the information processing section 24 (S65), receives selection of the device 6, software of which is updated, and a version from the datacenter administrator (S66), and passes the device 6 and the version to the information processing section 24.

The information processing section 24 repeats, by the number of the devices 6, processing for executing download of the selected firmware (S67) and instructing update execution of the firmware (S68). The device 6 executes update based on the execution instruction of the information processing section 24 (S69). The UI section 23 displays a result (S70).

Figures 1, 12B:
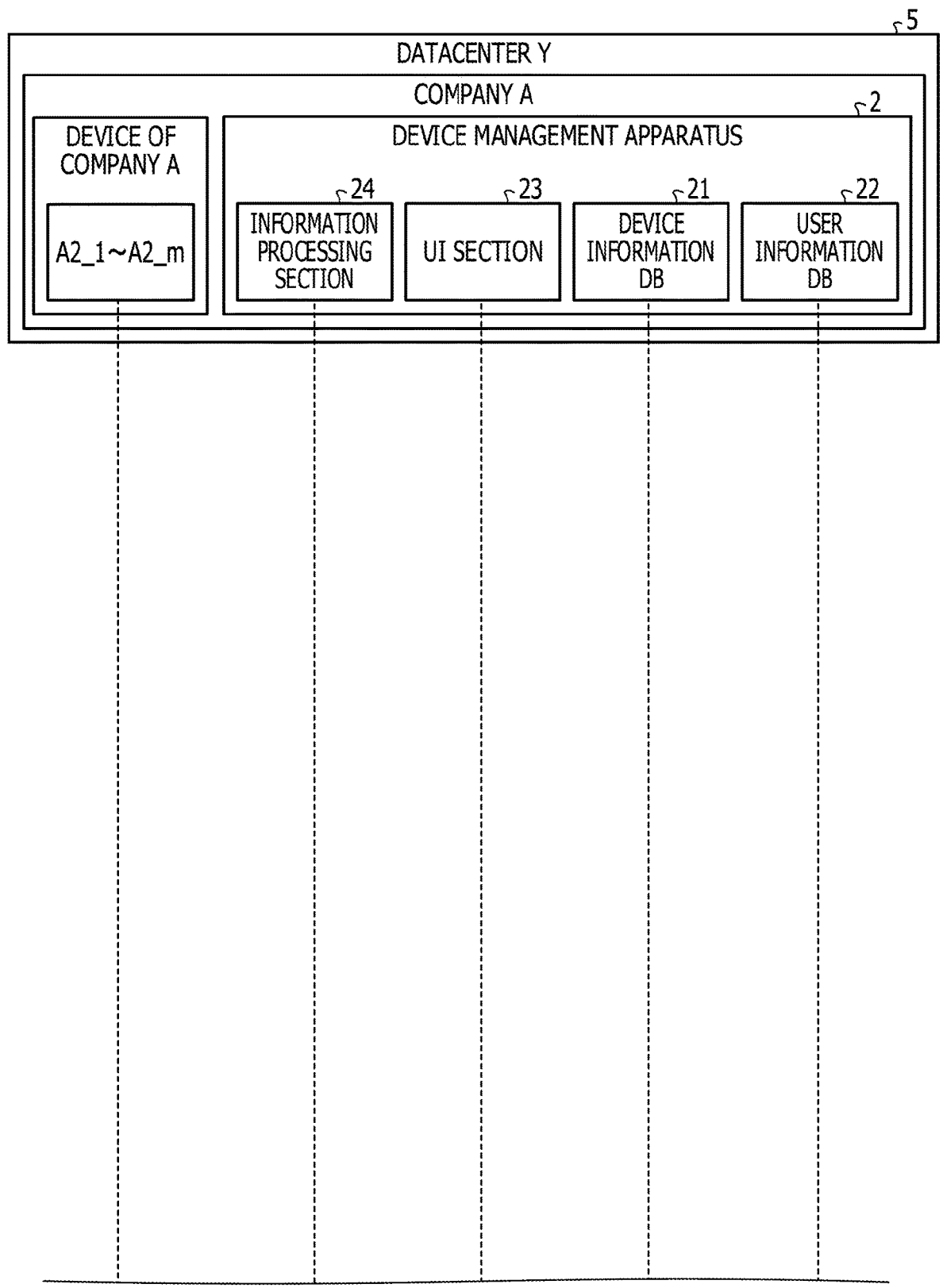
Figures 2, 12B:
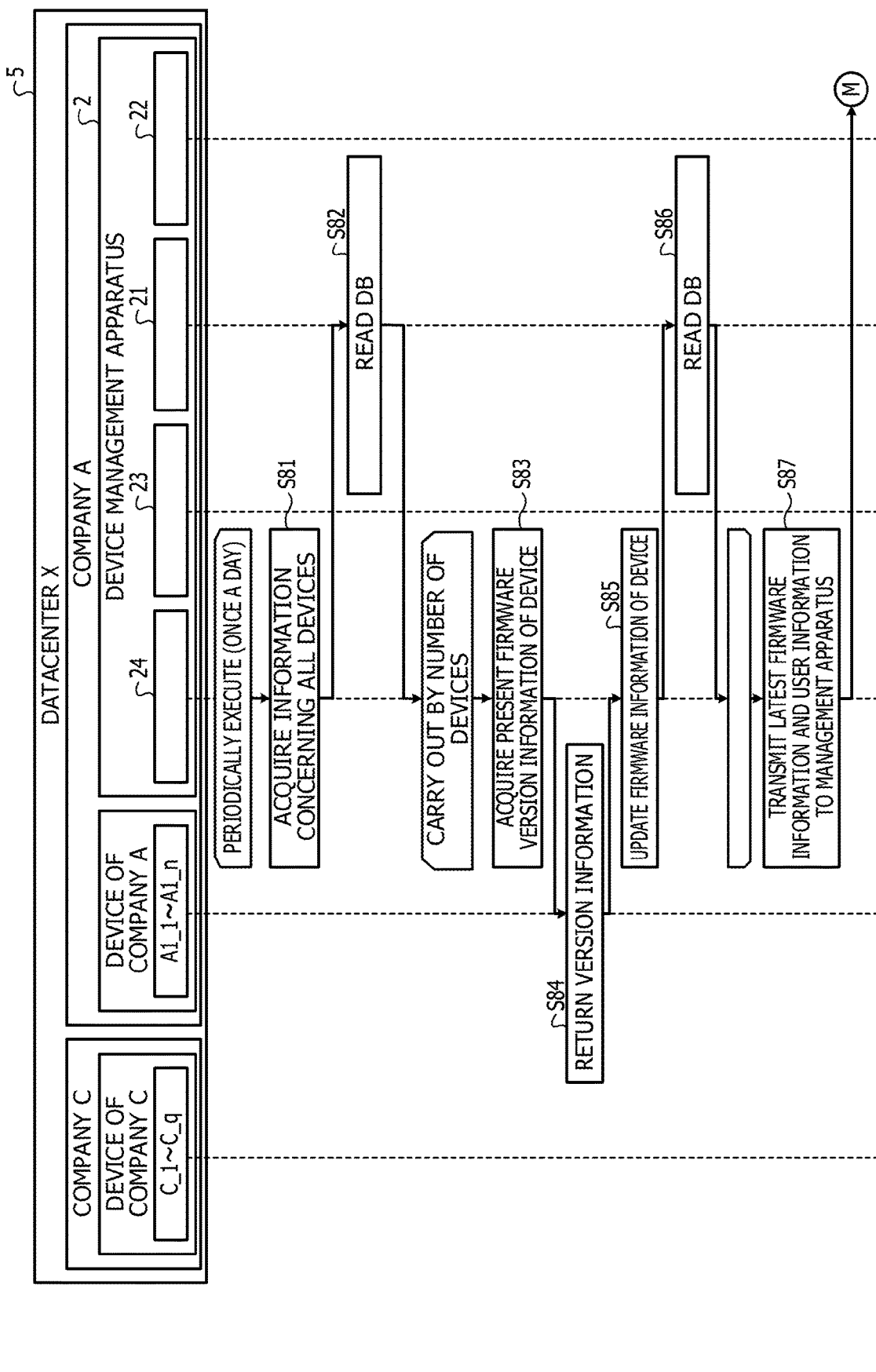
Figures 3, 12B:
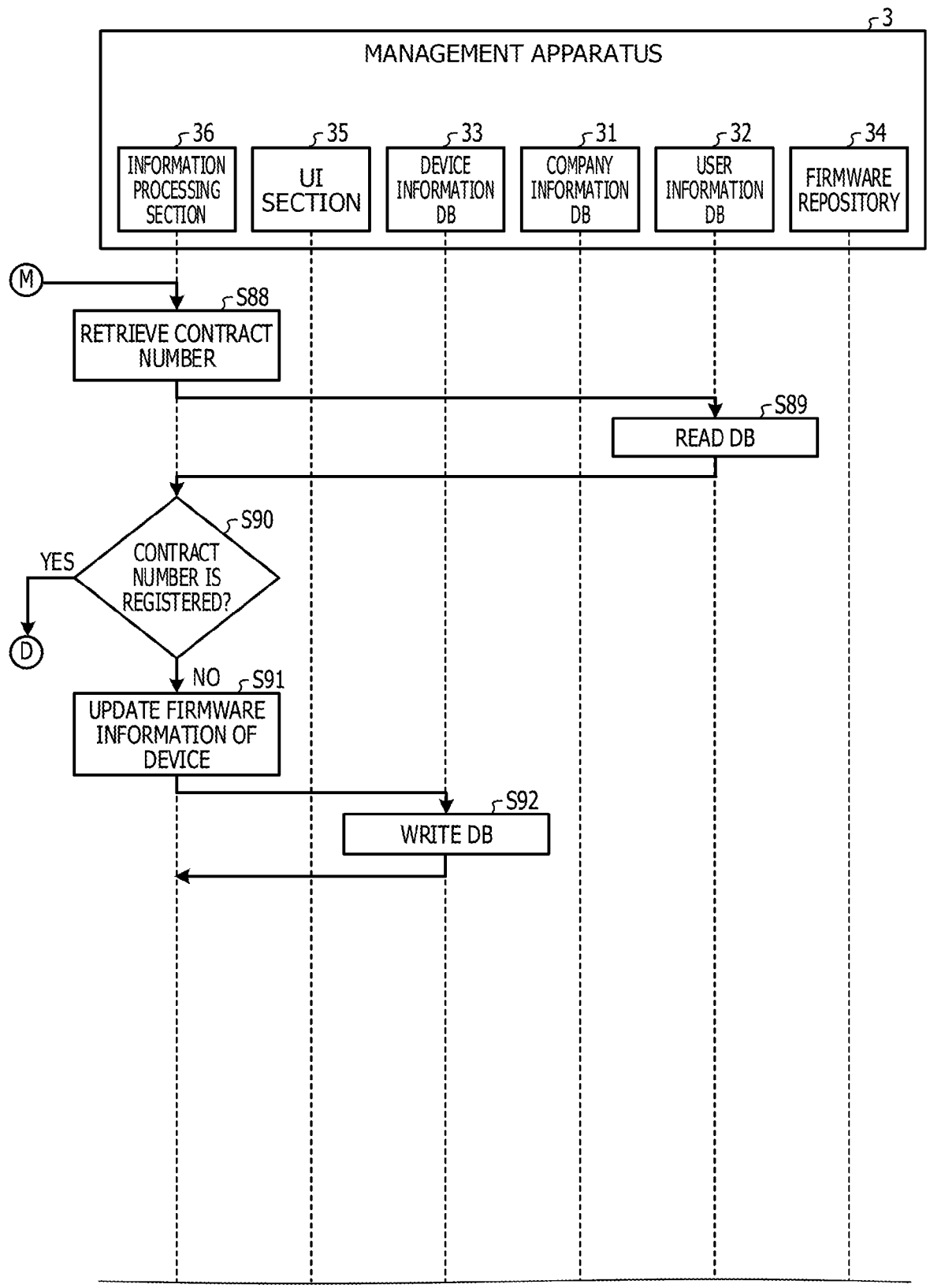
Figures 1, 12C:
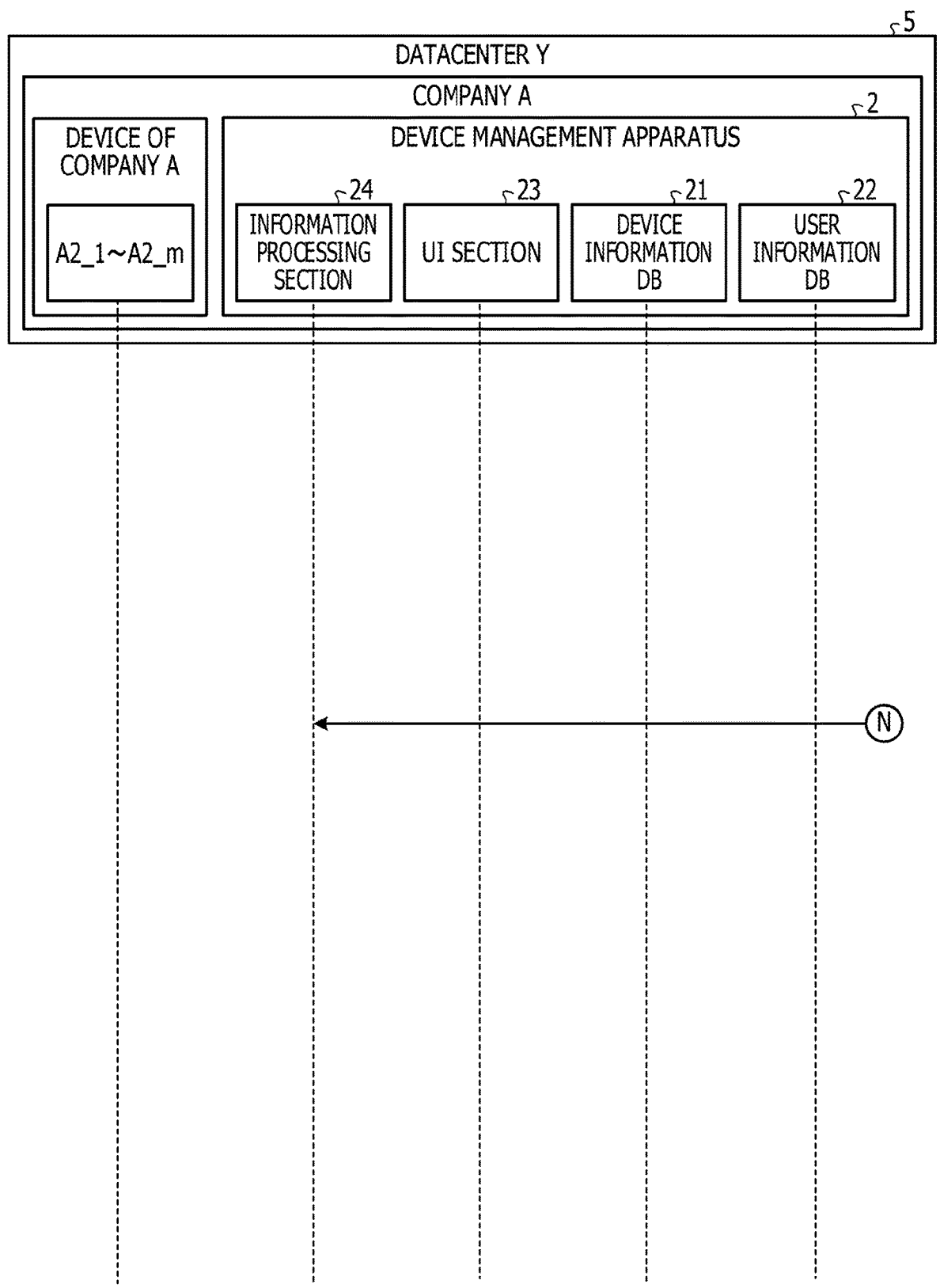
Figures 2, 12C:
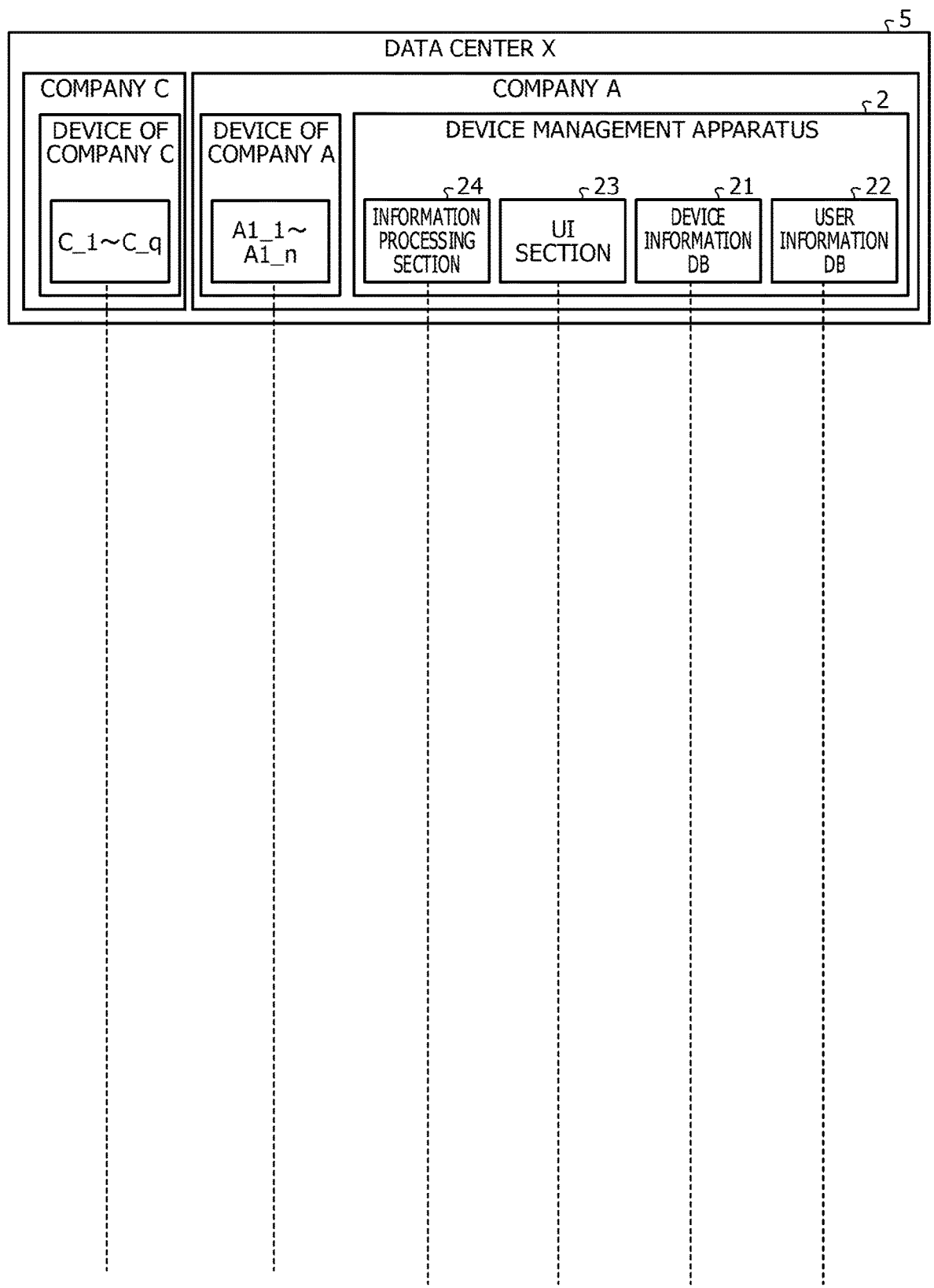
Figures 3, 12C:
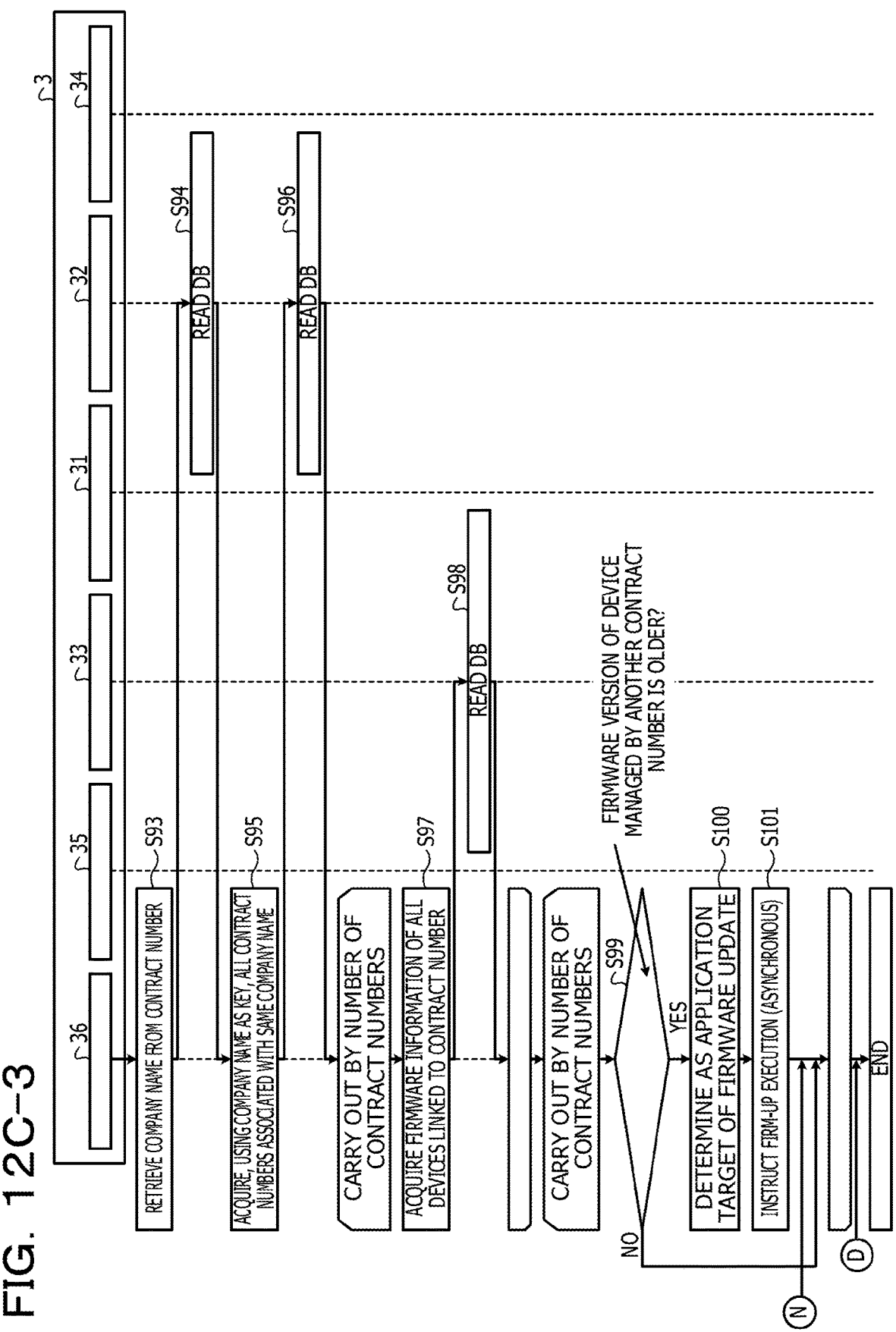
Figures 1, 12D:
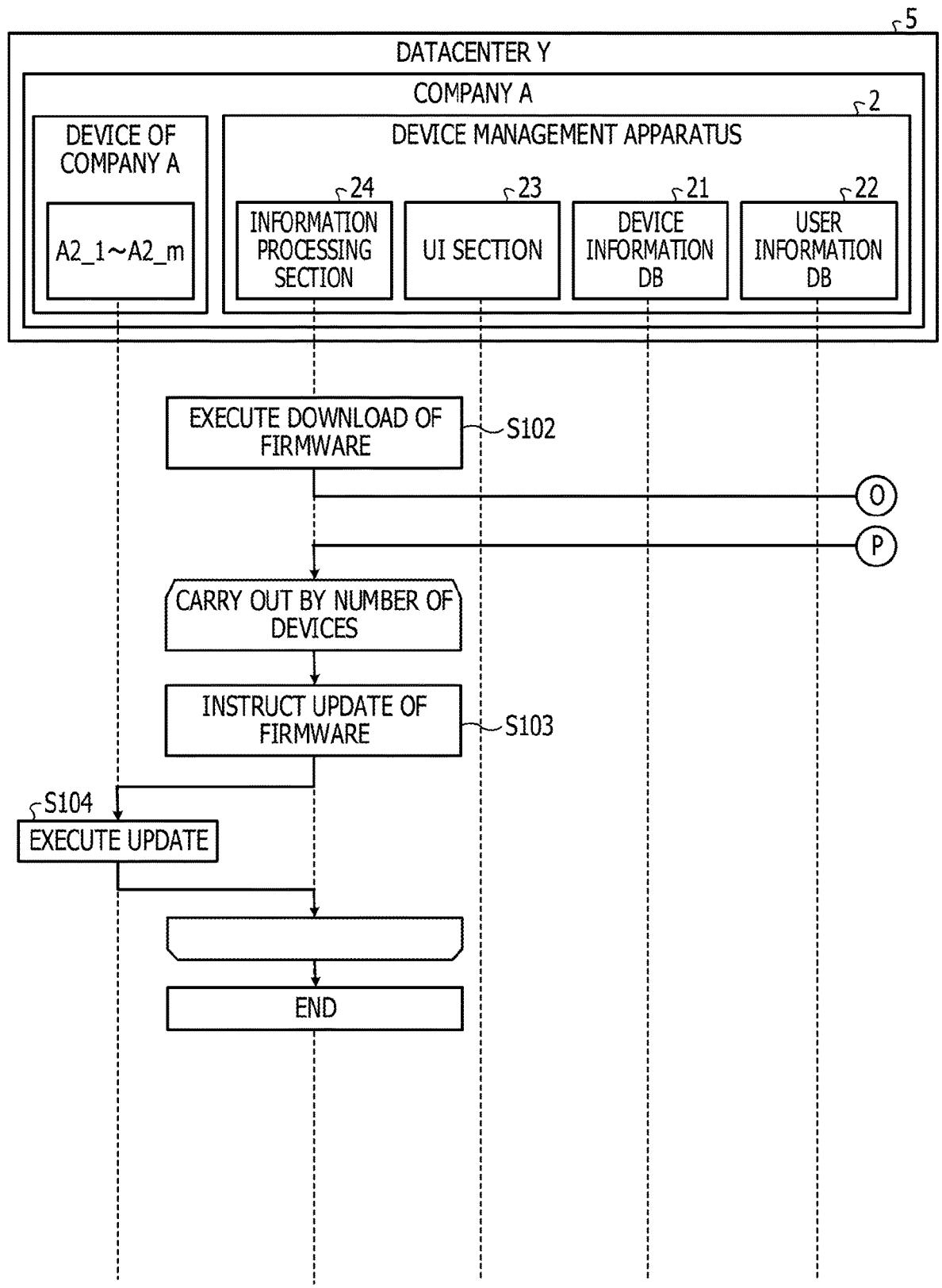
Figures 2, 12D:
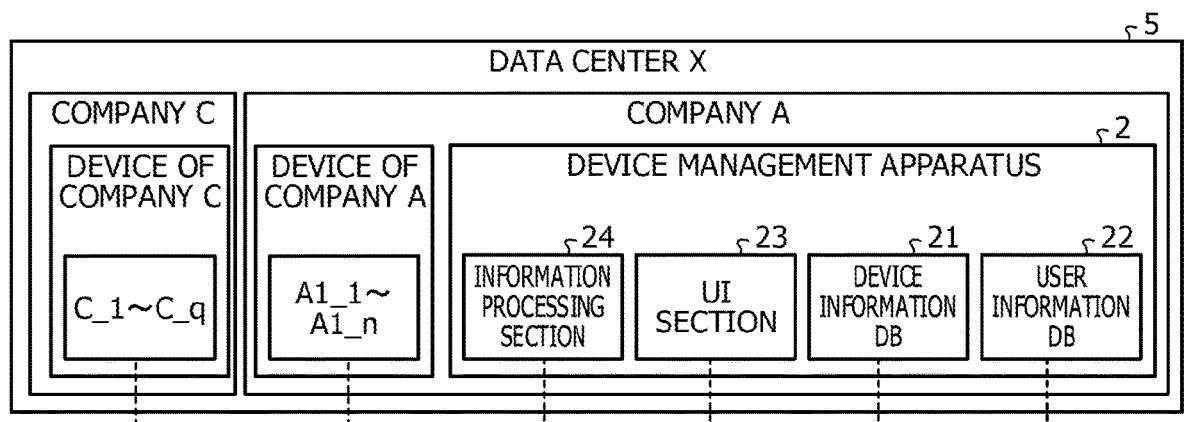
Figures 3, 12D:
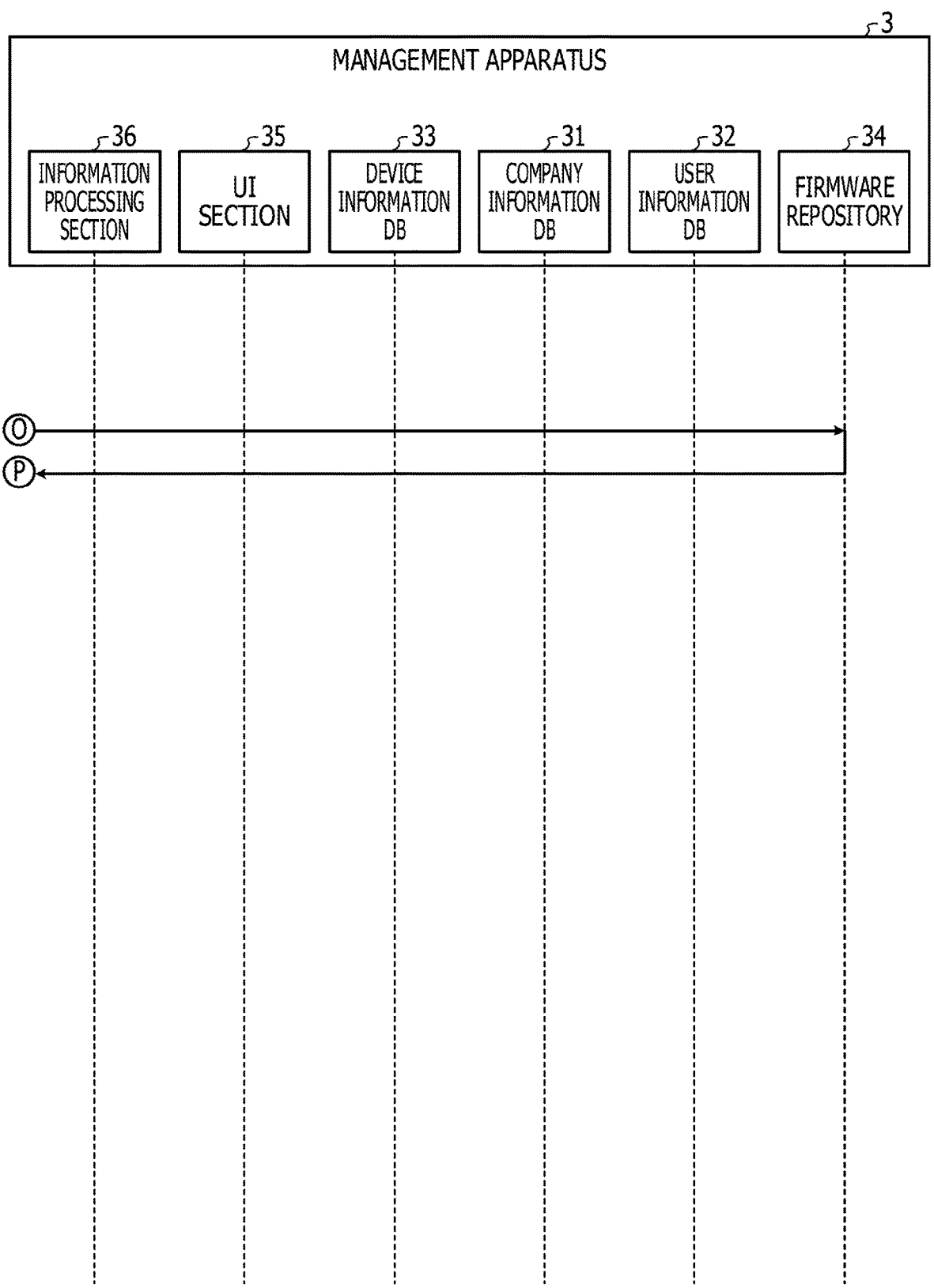

The device management apparatus 2 and the management apparatus 3 perform processing illustrated in FIGS. 12B to 12D periodically, for example, once a day. As illustrated in FIG. 12B-2, the information processing section 24 acquires information concerning all the devices 6 (S81). That is, for example, the information processing section 24 reads the device information DB 21 (S82) and acquires the information concerning all the devices 6.

The information processing section 24 repeats, by the number of the devices 6, processing for acquiring information concerning a present firmware version of the device 6 (S83) and updating the firmware information of the device information DB 21 (S85). The device 6 returns version information based on a request of the information processing section 24 (S84). The information processing section 24 performs writing in the device information DB 21 (S86) to update the firmware information of the device information DB 21.

The information processing section 24 transmits the latest firmware information and user information to the management apparatus 3 (S87). As illustrated in FIG. 12B-3, the information processing section 36 of the management apparatus 3 receives the latest firmware information and the user information and retrieves a contract number included in the user information from the user information DB 32 (S88). That is, for example, the information processing section 36 reads the user information DB 32 (S89) and determines whether the contract number is registered in the user information DB 32 (S90).

When the contract number is registered in the user information DB 32, the information processing section 36 updates the firmware information of the device 6 (S91). That is, for example, the information processing section 36 writes the firmware information in the device information DB 33 (S92). As illustrated in FIG. 12C-3, the information processing section 36 retrieves a company name from the contract number (S93). That is, for example, the information processing section 36 reads the user information DB 32 (S94) and acquires a company name.

The information processing section 36 acquires, using the acquired company name as a key, all contract numbers associated with the same company name (S95). That is, for example, the information processing section 36 reads the user information DB 32 (S96) and acquires, using the acquired company name as a key, all contract numbers associated with the same company name. The information processing section 36 repeats, by the number of contract numbers, processing for acquiring firmware information of all the devices 6 linked to the contract number (S97). The information processing section 36 reads the device information DB 33 (S98) to acquire the firmware information.

The information processing section 36 repeats the following processing in S99 to S101 by the number of contract numbers. In the processing in S99 to S101, the information processing section 36 determines whether a firmware version of the device 6 managed by another contract number is older (S99). The other contract number is a contract number other than the contract number sent from the device management apparatus 2 in S87.

When the firmware version of the device 6 managed by the other contract number is older, the information processing section 36 determines the device 6 managed by the other contract number as an application target of the firmware update (S100). The information processing section 36 instructs the device management apparatus 2 corresponding to the other contract number to perform firm-up execution (S101). The device management apparatus 2 corresponding to the other contract number is the device management apparatus 2 of the company A in the datacenter Y.

On the other hand, when the firmware version of the device 6 managed by the other contract number is not older, the information processing section 36 performs processing of the next contract number. When the contract number is not registered in the user information DB 32 in S90, the information processing section 36 ends the processing.

As illustrated in FIG. 12D-1, when receiving the instruction for the firm-up execution from the management apparatus 3, the information processing section 24 of the device management apparatus 2 of the company A in the datacenter Y executes download of firmware as illustrated in FIG. 12D (S102). The information processing section 24 repeats, by the number of the devices 6, processing for instructing the device 6 to update the firmware (S103). The device 6 executes update based on the instruction of the information processing section 24 (S104).

In this way, when the update of the firmware is notified from the device management apparatus 2, the management apparatus 3 instructs the device management apparatus 2 of the datacenter 5 where firmware of an older version than the updated firmware is installed in the device 6 to update the firmware. Therefore, the device management apparatus 2 may reflect update of firmware in another datacenter 5 on the management target device 6.

When the update of the firmware is notified from the device management apparatus 2, the management apparatus 3 may instruct the device management apparatus 2 of the other datacenter 5 to update the firmware only when a ratio of update in the datacenters 5 including the other datacenter 5 is equal to or larger than a predetermined threshold. When the update of the firmware is notified from the device management apparatus 2, the management apparatus 3 may determine based on the setting whether the automatic update or the confirmation update is performed and instruct the device management apparatus 2 of the other datacenter 5 to update the firmware only when determining that the automatic update is performed. When determining that the confirmation update is performed, the management apparatus 3 may display version information of the devices 6 to the device administrator and instruct, based on an instruction from the device administrator, the device management apparatus 2 of the other datacenter 5 to update the firmware.

As explained above, in the embodiment, the user information DB 32 stores the user information of all the datacenters 5 and the device information DB 33 stores the device information of all the datacenters 5. The specifying section 40 specifies, using the user information DB 32 and the device information DB 33, version information of firmware about the devices 6 of the same model deposited in the plurality of datacenters 5 by the user. The updating section 41 instructs the device management apparatus 2 to update the firmware of the device 6 based on the version information specified by the specifying section 40. Therefore, the management apparatus 3 may perform the update of the firmware based on version information of the devices 6 of the plurality of datacenters 5.

In the embodiment, the method determining section 44 determines based on the setting whether the automatic update or the confirmation update is performed. When the method determining section 44 determines that the automatic update is performed, the automatic update section 45 instructs, based on the version information specified by the specifying section 40, the device management apparatus 2 to update the firmware of the device 6. Therefore, the management apparatus 3 may perform the automatic update of the firmware based on the version information of the devices 6 of the plurality of datacenters 5.

In the embodiment, when the method determining section 44 determines that the confirmation update is performed, the confirmation update section 46 displays the version information specified by the specifying section 40 and instructs the device management apparatus 2 to update the firmware of the device 6 selected by the device administrator. Therefore, the management apparatus 3 may update, based on the version information of the devices 6 of the plurality of datacenters 5, the firmware of the device 6 selected by the device administrator.

In the embodiment, the second registering section 38 receives the user information from the device management apparatus 2 and stores the user information in the user information DB 32. The information receiving section 42 receives the user information and the latest firmware information from the device management apparatus 2 and updates the device information DB 33. Therefore, the management apparatus 3 may manage the user information and the device information of all the datacenters 5.

In the embodiment, the management apparatus 3 is explained. However, a management program having the same function may be obtained by realizing the configuration of the management apparatus 3 with software. Therefore, a computer that executes the management program is explained.

Figure 13:
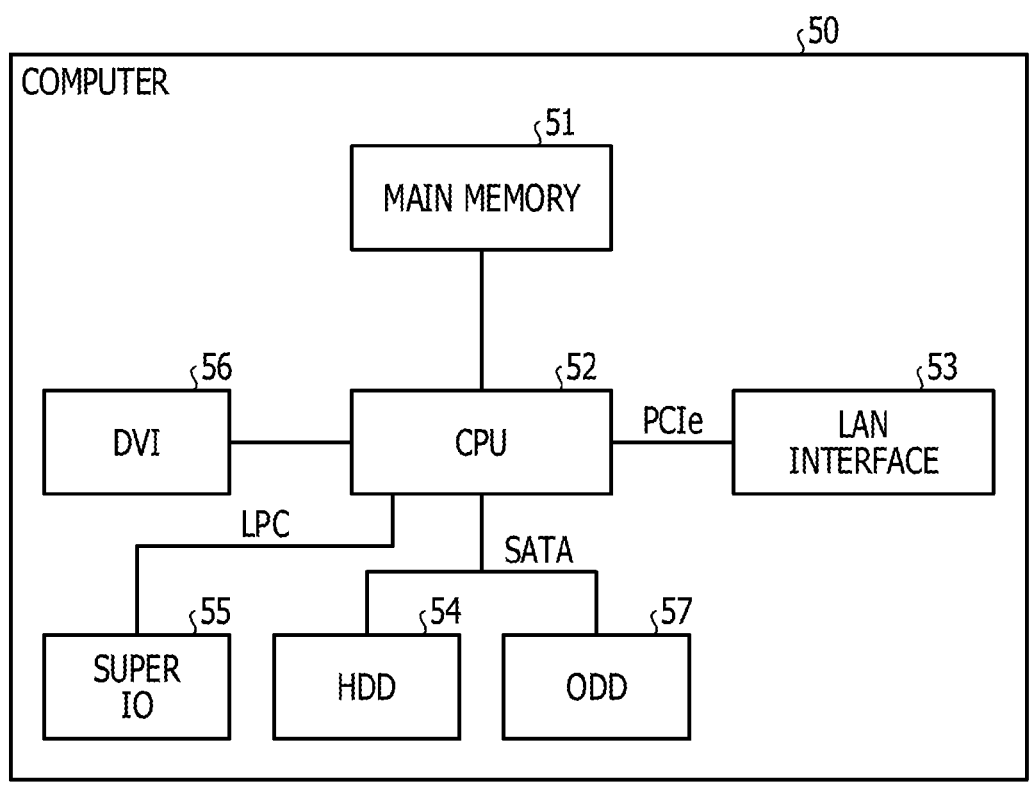
FIG. 13 is a diagram illustrating a hardware configuration of a computer that executes a management program according to the embodiment.

FIG. 13 is a diagram illustrating a hardware configuration of a computer that executes a management program according to the embodiment. As illustrated in FIG. 13, a computer 50 includes a main memory 51, a central processing unit (CPU) 52, which is an example of a processor, a local area network (LAN) interface 53, and a hard disk drive (HDD) 54. The computer 50 includes a super input output (IO) 55, a digital visual interface (DVI) 56, and an optical disk drive (ODD) 57.

The main memory 51 is a memory that stores a program, an execution halfway result of the program, and the like. The CPU 52 is a central processing unit that reads out the program from the main memory 51 and executes the program. The CPU 52 includes a chip set including a memory controller.

The LAN interface 53 is an interface for connecting the computer 50 to another computer through a LAN. The HDD 54 is a disk device that stores a program and data. The super IO 55 is an interface for connecting input devices such as a mouse and a keyboard. The DVI 56 is an interface that connects a liquid crystal display device. The ODD 57 is a device that performs reading and writing of a DVD and a CD-R.

The LAN interface 53 is connected to the CPU 52 by a PCI express (PCIe). The HDD 54 and the ODD 57 are connected to the CPU 52 by a serial advanced technology attachment (SATA). The super IO 55 is connected to the CPU 52 by a low pin count (LPC).

The management program executed by the computer 50 is stored in a CD-R, which is an example of a recording medium readable by the computer 50, read out from the CD-R by the ODD 57, and installed in the computer 50. Alternatively, the management program is stored in, for example, databases of other computer systems connected via the LAN interface 53, read out from the databases, and installed in the computer 50. The installed management program is stored in the HDD 54, read out to the main memory 51, and executed by the CPU 52.

In the explanation in the embodiment, the devices 6 are deposited in the datacenter 5. However, the user may set the devices 6 in another plurality of places. Alternatively, in the embodiment, the contract number and the company name are stored in the user information DB 22 and the user information DB 32 in association with each other. However, identification information for identifying attributes of the devices 6 may be stored in the database. The device information DB 33 may store the identification information instead of the contract numbers.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A management apparatus, comprising:
a memory configured to store user information indicating a plurality of users of a plurality of datacenters and device information in which identification information for identifying an attribute of a device, a model of the device, and firmware version information of the device are associated with each other for each of a plurality of devices disposed in the plurality of datacenters by the plurality of users; and
a processor coupled to the memory and configured to:
specify firmware version information for each of a plurality of target devices of which models are identical disposed in the plurality of datacenters by a user of the plurality of users based on the user information and the device information stored in the memory, and
execute update processing for firmware of at least one of the plurality of target devices based on the specified firmware version information.

2. The management apparatus according to claim 1, wherein the processor is configured to:
determine whether automatic update or confirmation update for confirming update with an operator is performed based on setting, and
when it is determined that the automatic update is performed, execute processing for updating the firmware of the device with firmware of firmware version information that is latest among a plurality of kinds of the specified firmware version information and is equal to or higher than a predetermined ratio.

3. The management apparatus according to claim 1, wherein the processor is configured to:
determine whether automatic update or confirmation update for confirming update with an operator is performed based on setting, and
when it is determined that the confirmation update is performed, display a plurality of kinds of the specified firmware version information, and
execute the update of the firmware based on a device selected by the operator and the firmware version information.

4. The management apparatus according to claim 1, wherein the processor is configured to store the device information for each of the plurality of datacenters in the memory based on device information received from systems in the plurality of datacenters.

5. The management apparatus according to claim 4, wherein each of the systems is disposed in one of the plurality of datacenters and configured to monitor firmware of devices disposed in the one of the plurality of datacenters.

6. The management apparatus according to claim 1, wherein the processor is configured to when receiving information concerning update of firmware of a first model associated with the identification information from a system in a first datacenter among systems in the plurality of datacenters, respectively specify firmware version information of a first model included in the device information associated with the identification information.

7. A management system, comprising:
a management apparatus that includes:

a memory configured to store user information indicating a plurality of users of a plurality of datacenters and device information in which identification information for identifying an attribute of a device, a model of the device, and firmware version information of the device are associated with each other for each of a plurality of devices disposed in the plurality of datacenters by the plurality of users; and a first processor coupled to the memory and configured to:

specify, based on the user information and the device information stored by the memory, firmware version information for each of a plurality of target devices of which models are identical disposed in the plurality of datacenters by a user of the plurality of users, and execute update processing for firmware of at least one of the plurality of target devices based on the specified firmware version information; and a device management apparatus that includes a second processor configured to:

download the firmware of the at least one of the plurality of target devices based on an instruction by the first processor, and instruct the at least one of the plurality of target devices to update the firmware.

8. A management method executed by a processor included in a management apparatus, the management method comprising:

storing user information indicating a plurality of users of a plurality of datacenters and device information in which identification information for identifying an attribute of a device, a model of the device, and firmware version information of the device are associated with each other for each of a plurality of devices disposed in the plurality of datacenters by the plurality of users, in a memory;

specifying firmware version information for each of a plurality of target devices of which models are identical disposed in the plurality of datacenters by a user of the plurality of users based on the user information and the device information stored in the memory; and executing update processing for firmware of at least one of the plurality of target devices based on the specified firmware version information.

9. The management method according to claim 8, further comprising determining whether automatic update or confirmation update for confirming update with an operator is performed based on setting, wherein the executing update processing includes executing processing for updating the firmware of the device with firmware of firmware version information that is latest among a plurality of kinds of the specified firmware version information and is equal to or higher than a predetermined ratio when it is determined that the automatic update is performed.

10. The management method according to claim 8, further comprising determining whether automatic update or confirmation update for confirming update with an operator is performed based on setting; and displaying a plurality of kinds of the specified firmware version information when it is determined that the confirmation update is performed, wherein the executing update processing includes executing the update of the firmware based on a device selected by the operator and the firmware version information.

11. The management method according to claim 8, wherein the storing includes storing the device information for each of the plurality of datacenters in the memory based on device information received from systems in the plurality of datacenters.

12. The management method according to claim 8, wherein the specifying includes when receiving information concerning update of firmware of a first model associated with the identification information from a system in a first datacenter among systems in the plurality of datacenters, respectively specifying firmware version information of a first model included in the device information associated with the identification information.

* * * * *